(12) United States Patent
Kasperski et al.

(10) Patent No.: US 7,747,639 B2
(45) Date of Patent: Jun. 29, 2010

(54) ALTERNATIVE SEARCH QUERY PREDICTION

(75) Inventors: Richard Kasperski, Creston (CA);
Arkady Borkovsky, Palo Alto, CA (US); Ralph R. Rabbat, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 196 days.

(21) Appl. No.: 11/430,487

(22) Filed: May 8, 2006

(65) Prior Publication Data

US 2007/0050351 A1 Mar. 1, 2007

Related U.S. Application Data

(63) Continuation-in-part of application No. 11/313,525, filed on Dec. 20, 2005, which is a continuation-in-part of application No. 11/212,044, filed on Aug. 24, 2005.

(51) Int. Cl.
*G06F 17/30* (2006.01)
(52) U.S. Cl. ...................................... 707/765
(58) Field of Classification Search ....................... None
See application file for complete search history.

(56) References Cited

U.S. PATENT DOCUMENTS

| | | | | |
|---|---|---|---|---|
| 4,255,796 A | 3/1981 | Gabbe et al. | ................ | 707/3 |
| 4,433,392 A | 2/1984 | Beaven | ................ | 707/6 |
| 5,278,980 A | 1/1994 | Pedersen et al. | ................ | 707/4 |
| 5,845,278 A | 12/1998 | Kirsch et al. | | |
| 5,913,215 A | 6/1999 | Rubinstein et al. | ........ | 707/10 |
| 6,169,984 B1 | 1/2001 | Bogdan | | |

(Continued)

FOREIGN PATENT DOCUMENTS

DE 102 35 548 A1 3/2002

(Continued)

OTHER PUBLICATIONS

International Searching Authority, "Notification of Transmittal of the International Search Report and The Written Opinion of The International Searching Authority, or The Declaration", PCT/US2006/047543, dated May 30, 2007, 12 pages.

(Continued)

*Primary Examiner*—Mohammad Ali
*Assistant Examiner*—Syed H Hasan
(74) *Attorney, Agent, or Firm*—Hickman Palermo Truong & Becker LLP

(57) ABSTRACT

Providing an alternative search query to a predicted search query is disclosed herein. A search query is received from a client node. Prior to receiving an indication from the client node that the search query is completely formed, the following steps are performed: 1) a predicted search query is determined by predicting what the search query will be when completed; and 2) an alternative search query that differs from the predicted search query is determined based on the predicted search query. The alternative search query is provided to the client node. The alternative search query may be something that the user search query is unlikely to complete to. For example, in response to the user entering a search query of "brittany sp", an alternative search query with a spelling suggestion of "britney spears" is determined and provided to the user.

28 Claims, 19 Drawing Sheets

U.S. PATENT DOCUMENTS

| | | |
|---|---|---|
| 6,169,986 B1 | 1/2001 | Bowman et al. |
| 6,300,947 B1 | 10/2001 | Kanevsky |
| 6,385,602 B1 | 5/2002 | Tso et al. |
| 6,408,270 B1 | 6/2002 | Garber |
| 6,411,950 B1 | 6/2002 | Moricz et al. .................. 707/3 |
| 6,587,850 B2 | 7/2003 | Zhai |
| 6,640,218 B1 | 10/2003 | Golding et al. |
| 6,697,793 B2 | 2/2004 | McGreevy |
| 6,772,150 B1 | 8/2004 | Whitman et al. ............... 707/6 |
| 6,947,930 B2 | 9/2005 | Anick et al. |
| 6,978,264 B2 | 12/2005 | Chandrasekar et al. |
| 6,985,898 B1 | 1/2006 | Ripley et al. |
| 7,039,635 B1 | 5/2006 | Morgan et al. .................. 707/4 |
| 7,089,237 B2 | 8/2006 | Turnbull et al. |
| 7,181,438 B1 | 2/2007 | Szabo .......................... 707/2 |
| 7,236,923 B1 * | 6/2007 | Gupta ........................... 704/9 |
| 7,249,126 B1 | 7/2007 | Ginsburg et al. |
| 7,487,144 B2 | 2/2009 | Shakib et al. |
| 7,499,940 B1 | 3/2009 | Gibbs |
| 2002/0035574 A1 | 3/2002 | Dumas |
| 2002/0035673 A1 | 3/2002 | Roseborough et al. |
| 2002/0152204 A1 | 10/2002 | Ortega et al. |
| 2003/0018621 A1 | 1/2003 | Stiner et al. |
| 2003/0061205 A1 | 3/2003 | Cleghorn et al. |
| 2003/0101172 A1 | 5/2003 | De La Huerga |
| 2003/0135490 A1 | 7/2003 | Barrett et al. |
| 2003/0135499 A1 | 7/2003 | Schirmer et al. |
| 2003/0195877 A1 | 10/2003 | Ford et al. |
| 2003/0234821 A1 | 12/2003 | Pugliese ..................... 345/816 |
| 2004/0021691 A1 * | 2/2004 | Dostie et al. ................. 345/773 |
| 2004/0090465 A1 | 5/2004 | Robertson et al. |
| 2004/0143564 A1 | 7/2004 | Gross et al. |
| 2004/0153963 A1 * | 8/2004 | Simpson et al. .......... 715/500.1 |
| 2004/0215654 A1 | 10/2004 | Eberwine et al. |
| 2004/0267730 A1 * | 12/2004 | Dumais et al. ................. 707/3 |
| 2005/0024418 A1 | 2/2005 | Yoshiyama |
| 2005/0099407 A1 | 5/2005 | Pennington et al. |
| 2005/0114130 A1 * | 5/2005 | Java et al. ................... 704/240 |
| 2005/0192944 A1 | 9/2005 | Flinchem |
| 2005/0222981 A1 | 10/2005 | Lawrence et al. |
| 2005/0262059 A1 | 11/2005 | White |
| 2005/0283468 A1 | 12/2005 | Kamvar et al. ................. 707/3 |
| 2005/0288959 A1 | 12/2005 | Eraker et al. |
| 2006/0031747 A1 | 2/2006 | Wada et al. |
| 2006/0064411 A1 | 3/2006 | Gross et al. |
| 2006/0074680 A1 | 4/2006 | Cross et al. |
| 2006/0075120 A1 | 4/2006 | Smit |
| 2006/0173822 A1 | 8/2006 | Watson et al. |
| 2006/0190436 A1 * | 8/2006 | Richardson et al. ............ 707/3 |
| 2006/0206454 A1 | 9/2006 | Forstall et al. |
| 2006/0259479 A1 | 11/2006 | Dai |
| 2006/0287980 A1 | 12/2006 | Liu et al. |
| 2007/0005346 A1 | 1/2007 | Ueda et al. |
| 2007/0022299 A1 | 1/2007 | Yoshimura |
| 2007/0055652 A1 | 3/2007 | Hood et al. |
| 2007/0143262 A1 | 6/2007 | Kasperski |
| 2007/0162422 A1 | 7/2007 | Djabarov |
| 2007/0226198 A1 | 9/2007 | Kapur |
| 2007/0244863 A1 | 10/2007 | Adams et al. |
| 2008/0021721 A1 | 1/2008 | Jones et al. |
| 2008/0077558 A1 | 3/2008 | Lawrence et al. |
| 2008/0109401 A1 | 5/2008 | Sareen et al. |

FOREIGN PATENT DOCUMENTS

| | | |
|---|---|---|
| DE | 102 35 548 A1 | 10/2003 |
| EP | 0530 993 A2 | 3/1993 |
| EP | 1 006 704 A2 | 6/2000 |
| EP | 1 031 913 A2 | 8/2000 |
| EP | 1 408 674 A2 | 4/2004 |
| WO | WO 99/66427 | 12/1999 |
| WO | WO 99/66427 A1 | 12/1999 |
| WO | WO 01/80070 A | 10/2001 |
| WO | WO 2004/073286 | 8/2004 |
| WO | WO 2004/073286 A | 8/2004 |
| WO | WO 2004/073286 A2 | 8/2004 |
| WO | WO 2005/098592 | 10/2005 |
| WO | WO 2007/024594 | 3/2007 |

OTHER PUBLICATIONS

Claims, PCT/US2006/047543, 3 pages.
Yates, R et al., "Query Operations", XP-002311981, Chapter 5, 1999, pp. 117-139.
Google toolbar.
Inquisitor, http://www.inquisitorx.com.beta/, 1 page.
PCT International Search Report and Written Opinion, PCT/US2006/031993, dated May 16, 2007, 10 pages.
PCT International Search Report and Written Opinion, PCT/US2006/032255, dated May 16, 2007, 11 pages.
PCT International Search Report and Written Opinion, PCT/US2006/032243, dated May 16, 2007, 12 pages.
R. Baeza-Yates, et al, "Modern Information Retrieval, Chapter 5, Query Operations", Modern Informational Retrieval, Harlow: Addison-Wesley, GB, 1999, pp. 117-139, XP0022311981, ISBN: 0-201-39829-X.
"Communication Pursuant to Article 94(3) EPC" received in European case 06801807.6 dated Jun. 6, 2008, 3 pages.
Schurman, Kyle, "Microsoft Money 2005 Premium, Introducing Microsoft Money 2005", Smart Computing Website, vol. 16, Issue 2, Feb. 2005, 3 pages.
"Communication pursuant to Article 94(3) EPC" received in Application No. 06 801 807.6—2201 dated Mar. 26, 2009 (7 pages).
Current Claims of 06 801 807.6 -2201 dated May 9, 2008 (3 pages).
Clarke, C. et al., "Relevance ranking for one to three term queries" Information Processing and Management 36 (2000) pp. 291-311.
Scholer, F. et al., "Relevance Thresholds in System Evaluations" SIGIR'08 (Jul. 20-24, 2008) pp. 693-694.
Chinese Office Action received in Application No. 200680030930.5 dated Sep. 25, 2009 (23 pages).
Current claims in Application No. 200680030930.5 dated Dec. 2009 (3 pages).
Ling, M. et al., "An Intelligent Search Engine for WWW" Aug. 14, 2000 (5 pages).

* cited by examiner

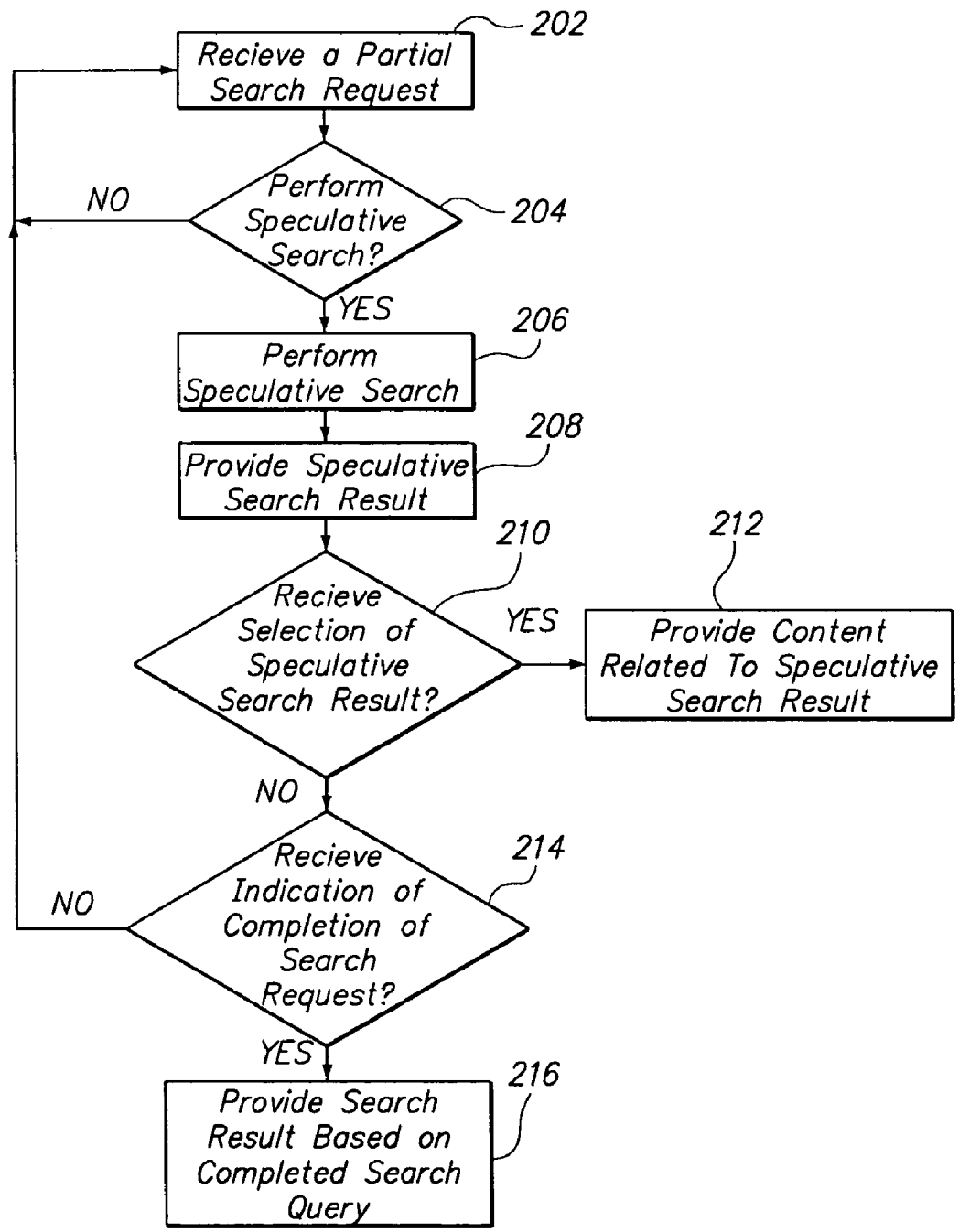

ALTERNATIVE SEARCH QUERY PREDICTION

RELATED APPLICATIONS

This application is a continuation-in-part and claims priority of U.S. patent Ser. No. 11/313,525, entitled INTERACTIVE SEARCH ENGINE, filed by Richard Kasperski, on Dec. 20, 2005, the contents of which are herein incorporated by reference as if originally set forth herein.

This application is a continuation-in-part and claims priority of U.S. patent Ser. No. 11/212,044, entitled SPECULATIVE SEARCH RESULTS FOR A SEARCH QUERY, filed by Stephen Hood et al., on Aug. 24, 2005, the contents of which are herein incorporated by reference as if originally set forth herein.

COPYRIGHT

A portion of the disclosure of this patent document contains material which is subject to copyright protection. The copyright owner has no objection to the facsimile reproduction by anyone of the patent document of the patent disclosure, as it appears in the United States Patent and Trademark patent file or records, but otherwise reserves all copyright rights whatsoever.

FIELD OF THE INVENTION

The present invention relates to search engines, and in particular, to providing alternative search queries to predicted search queries.

BACKGROUND OF THE INVENTION

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

The search engine typically has an interface allowing users to specify search criteria and an interface displaying the search results. Typically, the search engine orders the search results prior to presenting the search results interface to the user. The order usually takes the form of a "ranking," where the document with the highest ranking is the document considered most likely to satisfy the interest reflected in the search criteria specified by the user. The user is sent one (or more) search results pages based on the ranking. However, the user must still spend considerable time and effort processing the search results to determine whether the search query produced adequate search results. If the user is not satisfied with the results, the user forms a new search query and repeats the process.

Thus, the search process is often an iterative task in which the user forms a search query, determines whether the voluminous search results are adequate, and then re-formulates the search query, if needed. Therefore, the user experience with search engines is often frustrating and time consuming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a technique for providing a speculative search result for a search query, according to an embodiment of the present invention;

FIG. 11A, FIG. 11B and FIG. 11C are diagrams illustrating a user interface that displays predicted search queries and alternative search queries, according to an embodiment of the present invention;

DETAILED DESCRIPTION OF THE INVENTION

Figure 1A:
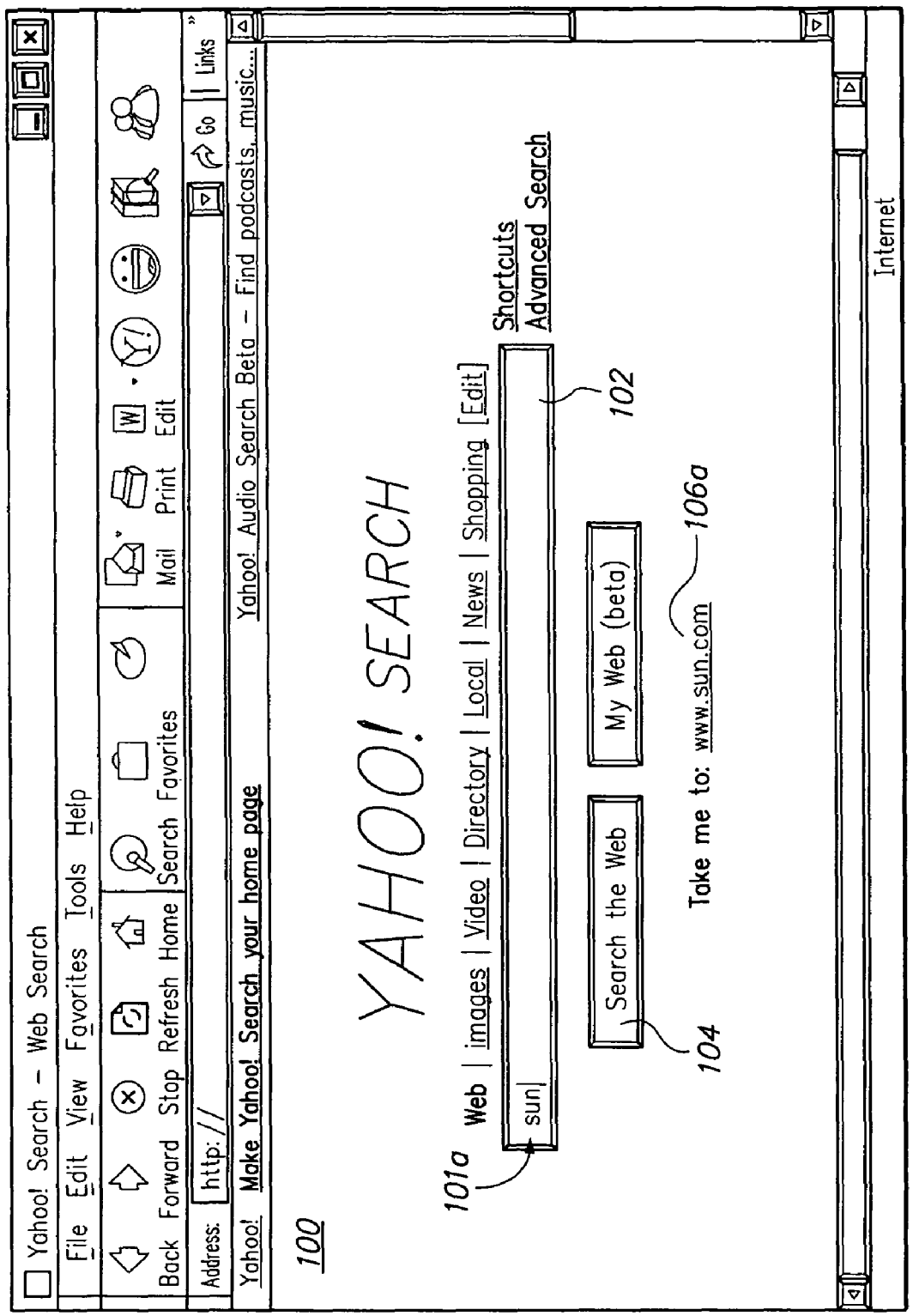
FIG. 1A, FIG. 1B, FIG. 1C, and FIG. 1D illustrate a graphical user interface for providing a speculative search result, according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Speculative Search Results Overview

Typically, when forming a search of the World Wide Web, or the like, a user will formulate a search query and then enter a carriage return, or click on a "search button", to initiate a search request based on the search query. The act that initiates the search request also serves to indicate that the search query has been "submitted". Prior to the act that initiates the search, the search query is "not-yet-submitted". Embodiments of the present invention perform a search and provide a speculative search result based on a not-yet-submitted search query prior to the user explicitly initiating the search request.

Techniques are described herein for providing a speculative search result for a search query prior to finalization of the search query. According to one embodiment, in response to receiving a not-yet-submitted search query from a client node, a speculative search result is provided to the client node for the not-yet-submitted search query prior to receiving an indication from the client node that said search query is completely formed. The speculative search result may be displayed on the same web page on the client node as the not-yet-submitted search query, while the search query is still being entered by the user. As the user continues to formulate the search query, a new speculative search result may be provided to the user.

The search request and search result may pertain to the World Wide Web; however, the techniques described herein are not so limited. More generally, the search request and result may pertain to any searchable data in any format. For example, the data may be a user's address book, saved links, personally stored images (such as .jpeg files, .gif files, etc.), video, audio (.mp3 files, .wmv files, etc.), contact cards (e.g., v-cards), calendar objects, word processing documents, graphics files, or computer code (object files and source code).

Speculative Search Initiation Criteria

To limit the frequency with which new speculative search results are provided during the entry of the search query, a determination may be made as to whether the not-yet-submitted search query meets criteria for initiating a search. Such criteria are referred to herein as "speculative search initiation criteria". The speculative search initiation criteria may be designed to limit the speculative search results to highly relevant results. For example, a criterion may be that the user has entered a complete word in the not-yet-submitted search query.

The speculative search initiation criteria can be used to ensure that the user is not inundated with frequently changing search results as the search query is formed. Moreover, requiring the satisfaction of speculative search initiation criteria helps ensure that the search engine is not inundated with search requests. Further, performing no search until satisfaction of speculative search initiation criteria may increase the likelihood that a speculative search result will have a sufficient relevancy to warrant its return to the user. For example, a speculative search result that is based on some partially formed words may have a low relevancy. However, there are situations in which a speculative search result based on a partially formed word may be highly relevant. Techniques are provided to determine which partial search queries, whether a partial word or not, are likely to lead to a relevant speculative search result.

One technique to determine whether the not-yet-submitted search query meets criteria for initiating a search and is thus sufficiently well-formed is to time how long it has been since the user last entered a character in the search request. If the timer has expired, then a search is initiated. The period of the timer can be dynamically adjusted to adapt to the user. For example, if user types too fast, then a search may be initiated too infrequently. Alternatively, if the user types slowly, then a search may be initiated too frequently.

Another technique to determine whether the not-yet-submitted search query meets speculative search initiation criteria is to determine if a given character is included in the search query. For example, if the user enters a space character, it is likely that the user has completed a word, wherein the search query may be sufficiently well-formed to initiate a search. As used herein, a "word" may be either a word that occurs in a natural language, such as English, or a special notation, such as an abbreviation, acronym, product code, URL, etc.

Another technique to determine whether the not-yet-submitted search query is sufficiently well-formed to initiate a search is to determine if the search query matches or nearly matches a phrase in a dictionary that comprises pre-defined phrases. The pre-defined phrases may be phrases that are likely combinations of words in search requests. In one embodiment, the dictionary is based on popular queries. In one embodiment, the dictionary is used to limit the number of search queries that are performed by determining if the not-yet-submitted search query matches, or nearly matches, a term or phrase in the dictionary, as a condition for performing a search.

The determination as to whether the not-yet-submitted search query is sufficiently well-formed to initiate a search is not limited to the techniques described herein. Moreover, the determination can be made using any combination of the techniques. The determination may be made at the client node, although this is not a requirement. In one embodiment, the client node has an AJAX (Asynchronous JavaScript+XML) engine to facilitate the determination as to whether to forward the not-yet-submitted search query to a search engine. The client node may make the determination by other techniques. In another embodiment, the determination of whether to initiate the search is made at a node other than the client, such as at the search engine.

Relevance Threshold

After the speculative search initiation criteria have been satisfied, pre-defined search rules are applied to provide the user with one or a few highly relevant speculative search results, which may be displayed on the same web page as the not-yet-submitted search query. For example, the pre-defined rules may include performing a first search that is likely to produce a highly relevant speculative search result. If the first search does not produce a speculative search result that meets a certain relevance threshold, then the user is not presented with the search results. Instead, a second search is performed. The second search is performed based on the current state of the not-yet-submitted search query, which may be different than the state of the not-yet-submitted search query upon which the first search was performed. If the results of the second search do not meet the relevance threshold, the results of the second search are not presented to the user. The process of repeatedly searching based on the not-yet-submitted search query may continue until the search query is submitted. Until the search query is submitted, the user is only presented with the results of speculative searches when those results meet the relevance threshold.

The different searches can employ different search techniques and/or may search different databases. This ordered searching, and the use of a relevancy threshold, provides the user with highly relevant results and avoids overloading the user with results, as no results need be returned to the user if the speculative search result relevancy or other criterion is deemed too low.

Example of Speculative Searches During Query Formulation

FIG. 1A, FIG. 1B, FIG. 1C, and FIG. 1D illustrate a graphical user interface 100 for providing a speculative search result, according to an embodiment of the present invention. The sequence in FIG. 1A-FIG. 1D illustrates that the speculative search result is updated with relevant search results as the user continues to further enter the search query. Techniques for determining when to initiate a new speculative search are described herein.

In FIG. 1A, the user has entered the search query 101a "sun" in the search box 102. The user has not yet entered an indication that the search query is complete. Thus, the text "sun" constitutes a not-yet-submitted search query. For example, the user has not yet clicked on the "Search the Web" button 104 or entered a carriage return to automatically trigger a search. However, the not-yet-submitted search query 101a is forwarded to a search engine, which provides a speculative search result 106a based on the not-yet-submitted search query 101a. In this case, the speculative search result 106a has a hypertext link providing a Uniform Resource Locator (URL).

The speculative search result 106a is one that is determined to have sufficient relevancy to merit providing it to the user. For example, it is undesirable to inundate the user with results having low relevancy. Embodiments of the present invention provide various techniques for determining what speculative search result has sufficient relevancy to merit returning to the user. Prior to completing the search query 101a, the user may click on the hypertext link 106a in the speculative search result 106a, if desired.

Figure 1B:
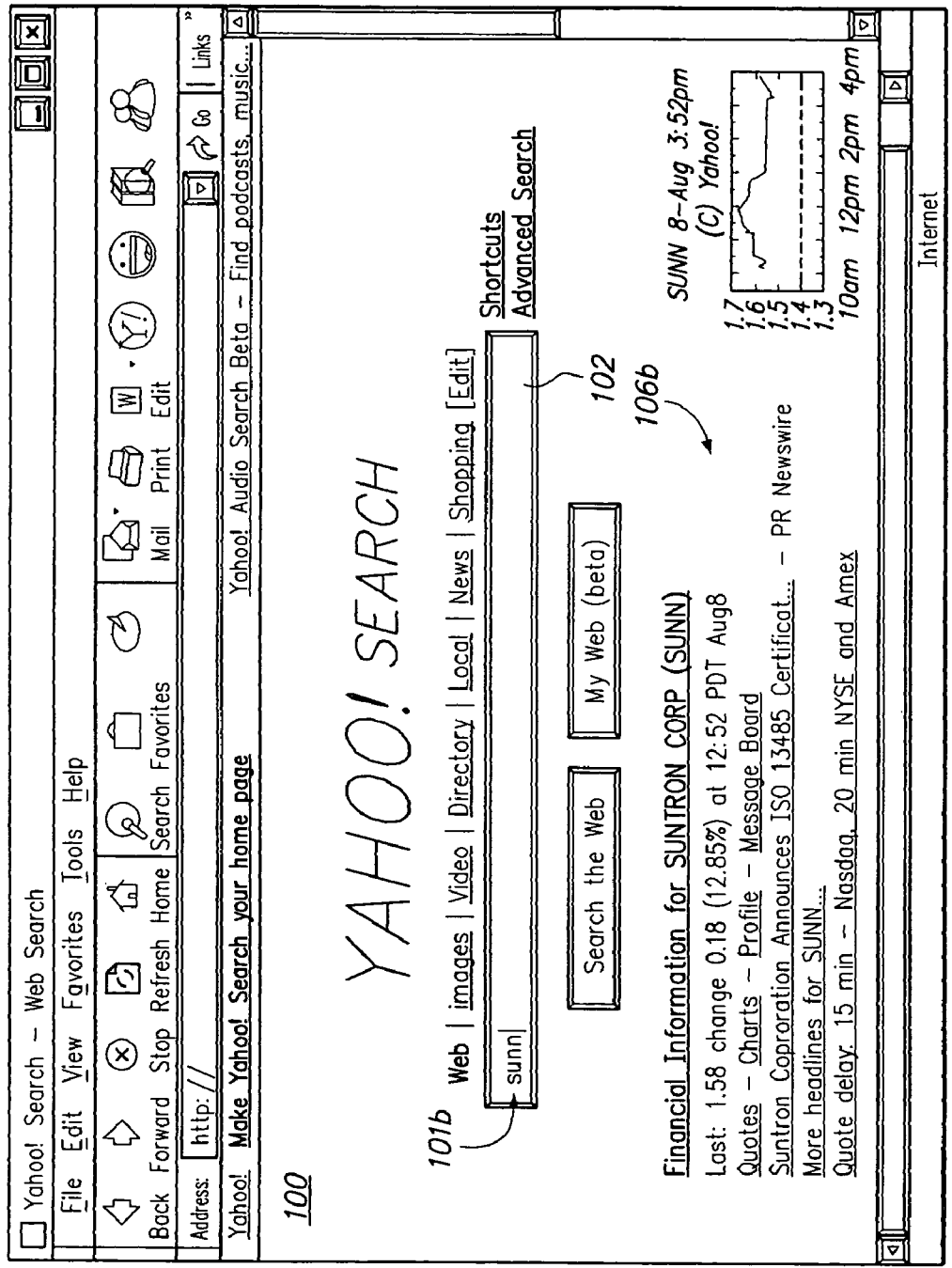

The speculative search result 106a may be updated as the user further enters the search query. FIG. 1B illustrates the graphical user interface 100 with the user having now entered a not-yet-submitted search query 101b of "sunn." A speculative search result 106b has been provided for the not-yet-submitted search query 101b "sunn." Thus, the speculative search result 106b has been updated based on the updated search query 101b. In this case, the speculative search result 106b includes an organized collection of information pertinent to a stock related to the not-yet-submitted search query 101a "sunn."

Figure 1C:
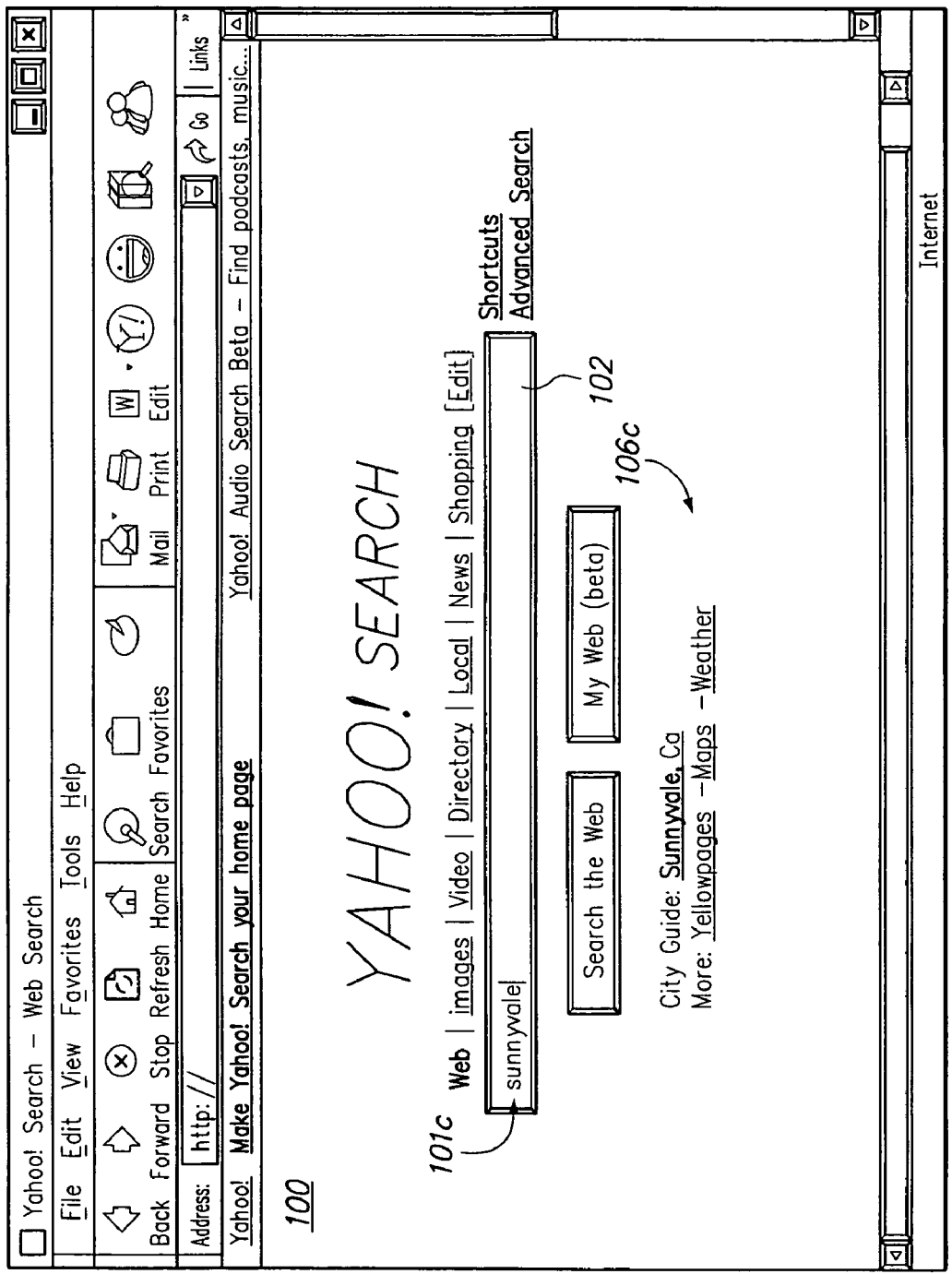

The speculative search result is not necessarily updated each time the user enters a new character in the search query 101. Referring now to FIG. 1C, the not-yet-submitted search query 101c is now "Sunnyvale". Based on the text "Sunnyvale", a new speculative search result 106c is provided that is related to the city of Sunnyvale, Calif. Note that for search queries such as "sunnyv" there is not necessarily an update to the speculative search results. Thus, while it would be possible to provide a speculative search result for the term "sunnyv," embodiments of the present invention determine that such a speculative search result should not be provided to the user. Techniques for making this determination are described herein.

Figure 1D:
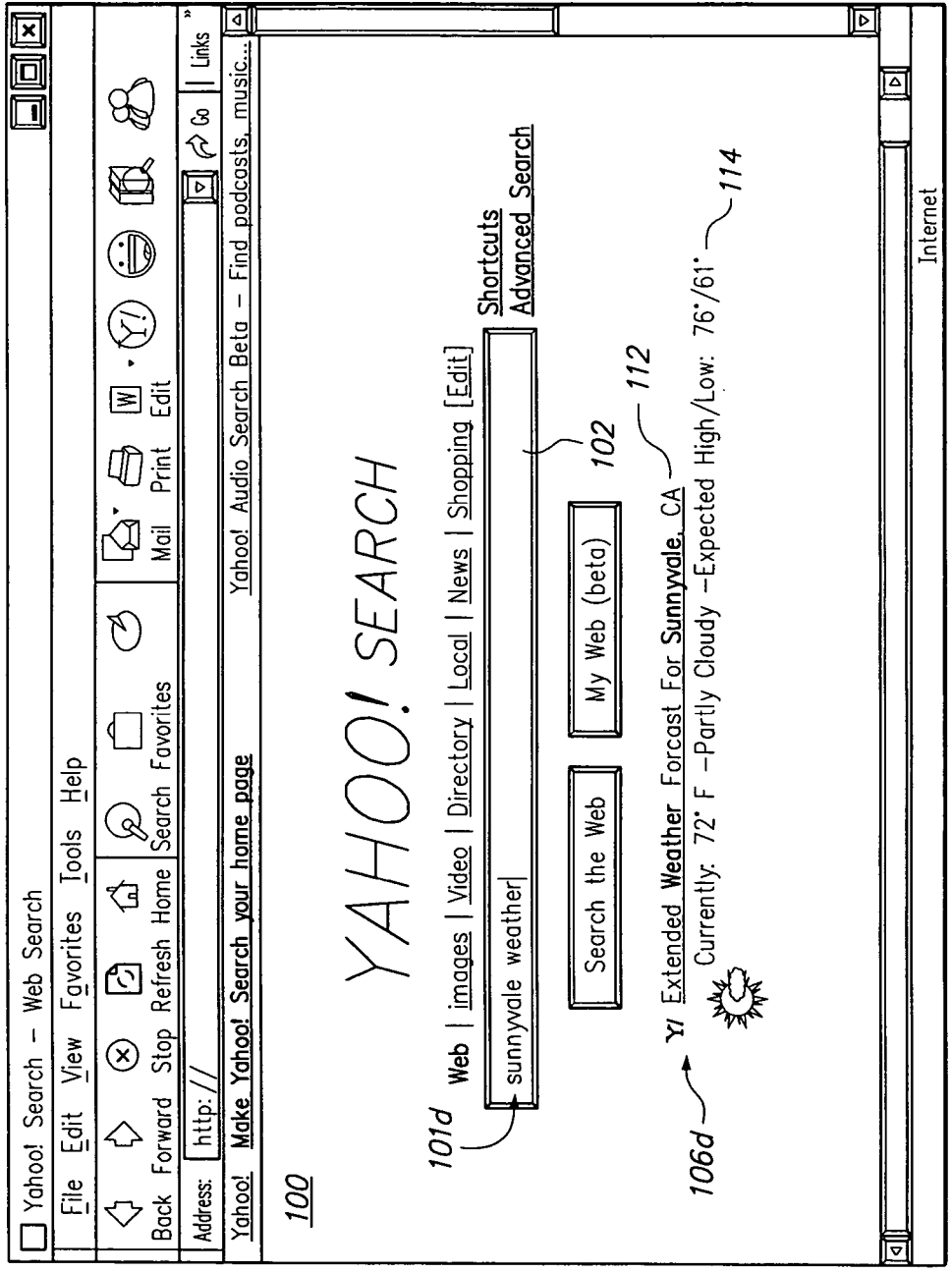

Referring now to FIG. 1D, the search query 101d is now "Sunnyvale weather," wherein a new speculative search result 106d is provided that is related to weather for Sunnyvale, Calif. In this case, the speculative search result 106d includes a link 112 to a weather site, as well as an abstract 114 providing an overview of the weather for Sunnyvale, Calif.

Providing Speculative Search Results

FIG. 2 is a flow diagram that illustrates a process 200 for providing a speculative search result to a search query, according to an embodiment of the present invention. In block 202, a not-yet-submitted search query is received. For example, an application executing on a client node receives a not-yet-submitted search query entered by a user. The not-yet-submitted search query may be forwarded to a search engine; although forwarding the not-yet-submitted search query to the search engine may take place later in process 200.

As used throughout this description, a not-yet-submitted search query means a search query for which no indication has been received, by a user interface for entering the search query, that the search request is complete. For example, when forming a search of the world wide web, or the like, a user will typically enter a carriage return or click on a "search button" to initiate the search request, thus indicating the search query is complete.

In block 204, a determination is made that the not-yet-submitted search query meets the speculative search initiation criteria. When the speculative search initiation criteria are satisfied, a search is initiated, in block 206. If the not-yet-submitted search query is not sufficiently well-formed to satisfy the speculative search initiation criteria, then the process 200 returns to block 202 to receive a further entry of the not-yet-submitted search query.

In block 206, a search is performed on the not-yet-submitted search query. The search may be performed in any convenient technique and may include several stages. An embodiment for performing the search is described in FIG. 3; however, the present invention is not limited to that technique. The search may be of any database. For example, the search is not necessarily of a database with an index based on a substantial portion of the world wide web. In one embodiment, at least a part of the search is of a database that pertains to information related to the user who is performing the search query. For example, the user's address book, calendar, etc., may be searched.

In block 208, a speculative search result is provided to the user. Exemplary speculative search results 106 are depicted in FIG. 1A-FIG. 1D, FIG. 4 and FIG. 5. The speculative search result may be displayed on the same web page on which the user is entering the search query. The speculative search result can take many different forms, including but not limited to, a link to a web page, a web page itself, a graphic (e.g., an interactive map), and a textual description. Thus, the user can view the speculative search result and determine the relevance of the speculative search result prior to indicating that the search query is complete. In a typical situation, a limited set of results are displayed to the user, so as to not overload the user with information. The search engine may forward to the client node a whole web page or only updated information for the client node to integrate into a web page currently stored on the client node. In one embodiment, the client node has an AJAX engine to facilitate the data transfer between the client and search engine, as well as to assist in rendering the updated web page.

If the user selects the speculative search result, in block 210, then content related to the speculative search result is provided, in block 212. For example, if user selects one of the links in the speculative search results 106 depicted in FIG. 1A-FIG. 1D, the user may be provided a web page related to the selected link.

If the user provides an indication that the search query is complete, then the user is provided search results that might be returned in a conventional search. Thus, if an indication that the search query is complete is received in block 214, then a complete search result is provided to the user in block 216. For example, if the user clicks on a search button (FIG. 1A, 104) or enters a carriage return, the client node forwards to the search engine a complete search query and an indication or implication that the search query is complete. Responsive to the complete search query, the search engine provides a complete search result, such as a list that may include URLs with brief descriptions of content associated with the URL. This complete search result may be provided on a separate web page from the search query web page.

The process 200 returns to block 202 if the user does not indicate that the search query is complete, wherein a further entry to the not-yet-submitted search query is received. The process 200 continues and may finish when the user selects one of the speculative search results for further information or indicates that the search query is complete.

Performing Speculative Searches

Figure 3:
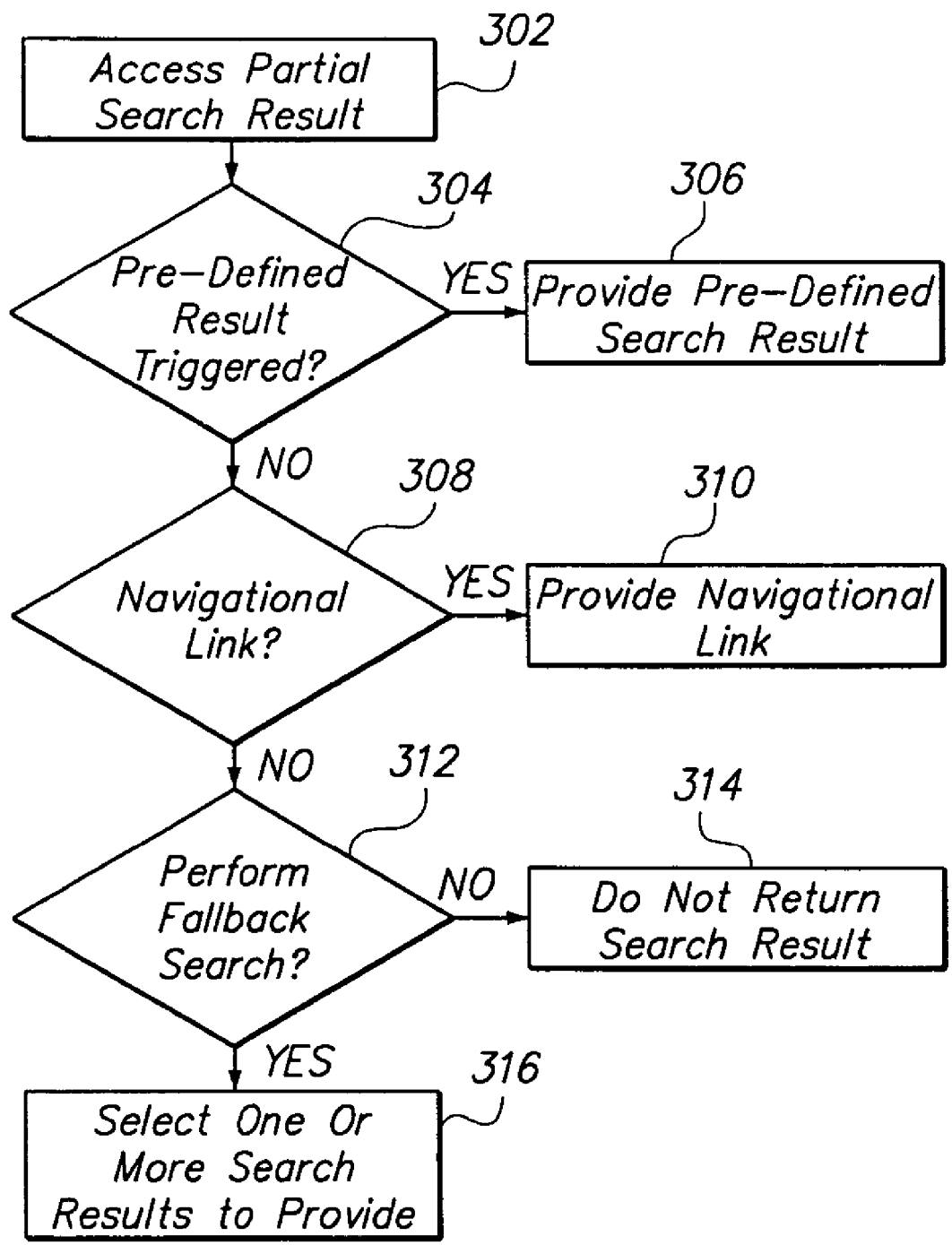
FIG. 3 is a flow diagram that illustrates a technique for determining a relevant speculative search result, according to an embodiment of the present invention.

After the decision to initiate a speculative search has been made, and before the user has explicitly initiated the search request, pre-defined search rules are applied to provide the user with one or a few highly relevant search results, which may be displayed on the same web page as the still being formed search query. FIG. 3 is a flow diagram that illustrates a process 300 for determining a relevant speculative search result to provide to the user, according to an embodiment of the present invention. This process 300 provides the user with results that are likely to be relevant and also reduces noise by filtering out search results that are expected to be less relevant. In block 302, a not-yet-submitted search query is accessed. For example, a search engine accesses the not-yet-submitted search query.

Figure 5:
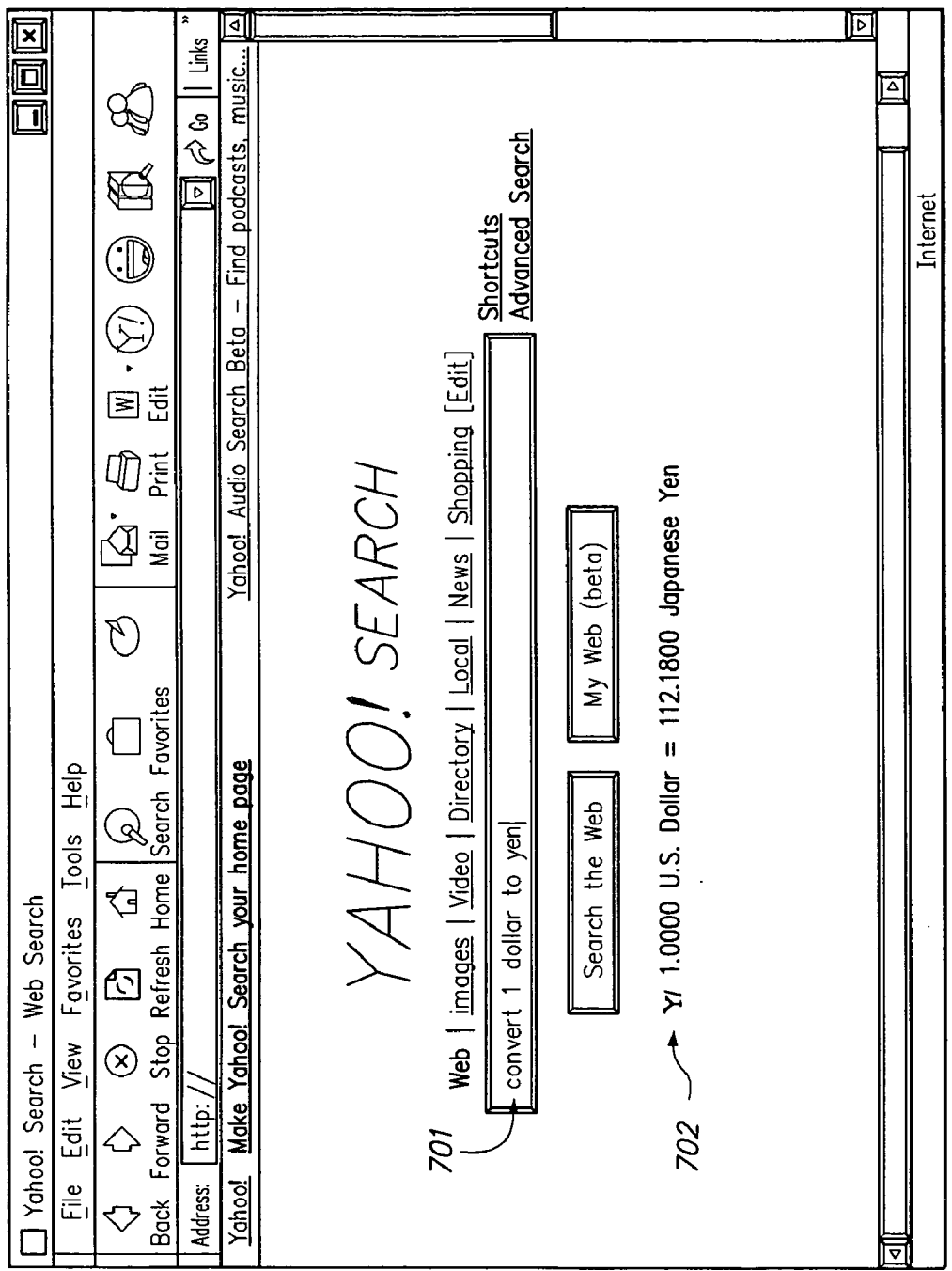

In block 304, a determination is made as to whether the search query triggers a pre-defined search result that may include an organized collection of information related to the search query. For example, based on an analysis of many searches, a set of pre-defined search results are formed that include various links related to a search query. As an example, the speculative search result for the stock depicted in FIG. 1B is an example of a search query that results in a pre-defined search result. Another example of a pre-defined search result is depicted in FIG. 5, in which a search result that converts from dollars to yen is provided in response to the search query "convert 1 dollar to yen."

If the search query matches (or nearly matches) a pre-defined search result in block 304, then the pre-defined search result is provided in block 306. For example, a web server transfers the pre-defined search result to the client node, wherein an application executing on the client node is able to display the result on the same web page as the search query being formed.

In block 308, the not-yet-submitted search query is analyzed to determine if it may be a search query to obtain a navigational link, such as a URL. For example, many users employ a search query to obtain a URL if the user is not certain of the URL. By analyzing the not-yet-submitted search query, a determination can be made if the search query appears to be an attempt to locate a URL. In some cases, the user may type a search query that would be expected to logically relate to a URL; however, the actual URL is different than would be expected. Built in intelligence can correct such a situation, such that the user is provided with a URL to a highly relevant web site.

If the determination in block 308 is that the search query may be for a navigational link, then the navigational link is provided to the user in block 310. For example, the search engine forwards the web link to the client node, wherein an application executing on the client node displays the navigational link on the same web page as the search query.

If the not-yet-submitted search query does not trigger either a pre-defined search result or a navigational link, then a determination is made as to whether to provide a fallback search result to the user, in block 312. The relevancy of a potential fallback result can be assessed prior to providing it to the user, such that the user is not inundated with results having low relevancy. In one embodiment of the present invention, a dictionary is used to filter the search query prior to performing the fallback search. Thus, if the search query does not match, or nearly match, a term or phrase in the dictionary, the process 200 goes to block 314 in which a fallback search is not performed. In one embodiment, the phrases in the dictionary are learned from a statistical analysis of searches.

If test of block 312 determines that a fallback search should be performed, then one or more fallback search results are selected for providing to the user, in block 316. The fallback search results may include a title of a web page, one or more abstracts of a page, and a Uniform Resource Locator (URL) of a page. The fallback result can provide a single result (or limited number of results) of a web search or partial web search. Moreover, the scope of the search can be adjusted to impact the expected relevancy of search results. Fallback search results are described in greater detail hereafter.

Fallback Search Results

Rather than provide uncommon search results, which may have a low relevancy, the fallback search can be confined to a set of common search results. For example, the results of the top 50,000 searches are tracked, wherein a fallback search result is only provided of the not-yet-submitted search query triggers one of the popular search results. Any convenient number of popular search results may be used. Thus, embodiments of the present invention avoid providing the user with a non-relevant search result just because a search based on a not-yet-submitted search query triggers an obscure web page. The fallback search results can be based on any set of user searches ranging from everyone who uses the search engine to only the user who is forming the current search query.

In order to simplify the user experience, a limited number of fallback results are shown on the search query page. For example, only a single result may be provided to the user in one embodiment. Typically, results of searchers are accorded a relevancy. In one embodiment, the search result with the highest relevancy is provided. Alternatively, a few results can be provided based on an analysis of the relevancy. In one embodiment, the search result is only provided if its relevancy exceeds a threshold. Multiple results can be provided if the spread in relevancy between top results is close. The threshold can be dynamic. An abstract can be shown with the result to help guide the user as to its relevancy.

Relevancy may be determined by a variety of techniques. For example, a page's relevance score may be based on how many words, from the search query, are contained in the page, and/or how frequently those words occur in the page. A page's relevance score may also take into account some "page quality metrics" like a citation index, the authoritativeness of the page source, etc. A page's relevance may also be defined relative to the user who submitted the query. For example, relevance may be based on the language used to submit the query (e.g., English or French). For another example, relevance may be based on properties of the user (e.g., the user's geographic region, gender, or social group). Thus, relevance scores for pages that result from query submitted by a user in the United Kingdom may be determined differently than relevance scores for pages that result from the same query submitted by a user in the United States.

Suggestions to Improve Search Query

In order to improve the quality of a search query, an embodiment of the present invention suggests an alternative spelling to a search query that is being formed prior to the user indicating that the search query is complete. For example, the user may enter a preliminary search query that is determined to have a possible spelling error. The user is prompted with an alternative spelling suggestion in accordance with an embodiment of the present invention. Moreover, the spelling suggestion is provided prior to the user indicating that the search query is complete. The user may click on a provided link associated with the spelling suggestion to cause the spelling in the search box to be automatically corrected. Further, responsive to the user clicking the link associated with the suggested spelling, a navigational link may be provided as a speculative search result.

In another embodiment, the user is prompted to try another search query based on an analysis of the not-yet-submitted search query. The suggested alternative search query is provided responsive to the not-yet-submitted search query, while the user is still entering the search query.

In one embodiment, a history of a user's search requests is tracked and used to determine a relevant search result. For example, if the user frequently accesses a certain weather report, a link may be automatically provided upon the user typing in the beginning of the search query.

One type of speculation to enhance the user experience is to speculate as to what the not-yet-submitted search query will turn out to be and proactively search based on the speculated complete search query. For example, a database can be indexed with the partially formed search query to speculate as to what the complete search query might be. Alternatively, information that is user specific such as an address or phone book can be searched with the partially formed search query to speculate as to what the complete search query might be. For example, if the phrase, "john telep" is entered by the user as a not-yet-submitted search query, the user's telephone/address book can be searched to find the telephone number of anyone named John. The telephone number is provided to the user responsive to the not-yet-submitted search query. Other user databases could be searched as well, such as e-mail, note pad, favorite places, history, etc.

Exemplary Search Results

Figure 4:
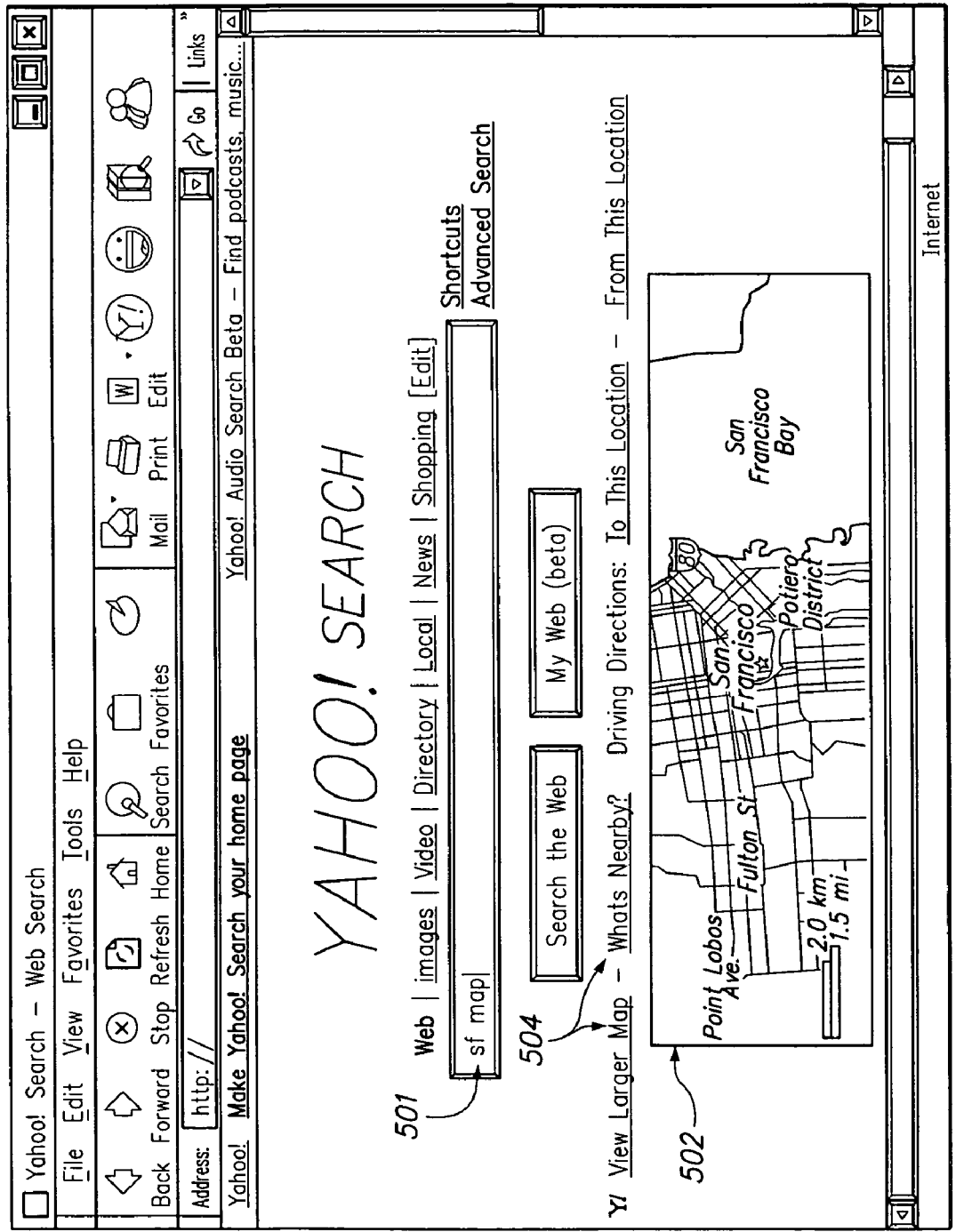
FIG. 4 and FIG. 5 illustrate various types of speculative search results that are provided by embodiments of the present invention.

Embodiments of the present invention analyze the search query for keywords to determine what type of a search to perform. For example, FIG. 4 illustrates an example in which the user has entered a search 501 of "sf map," wherein a map 502 of San Francisco is provided while the user is typing in the search query 502. Moreover, other helpful links 504 are provided in the speculative search result.

Predictive Search Query Overview

Techniques are provided for providing an interface to a search engine. An interface to a search engine assists the user 1) by predicting what the user is searching for based on the character or characters the user has entered so far in the query field of the interface, and 2) by providing search results to the user via the interface without the user having to formally issue the intended query. For each character entered into the query field, that portion of the query entered so far is automatically issued to a query predictor that determines a set of one or more predicted queries that correspond to the portion of the query. The set of predicted queries is determined based on the frequency of previously issued queries alone or also on when the previous queries were issued. The most likely predicted query is processed by a search engine to obtain search results. Both the predicted queries and the search results are provided to the user via the interactive user interface. The predicted queries, when displayed to the user, may be ordered based on their popularity (frequency-based) alone or also on their temporal relevance (time-based).

If the user is not interested in the search results based on the most likely predicted query, the user may select any query in the set of predicted queries. When the user selects a different predicted query in the list, the search results are then updated to display the search results that pertain to the different predicted query.

In addition to displaying the predicted queries and search results to the user via the user interface, other dynamic data may be provided that relate to the most likely predicted query but are not necessarily obtained by the search results, such as advertisements and other related links to websites.

Predictive Search Functional Overview

Figure 6:
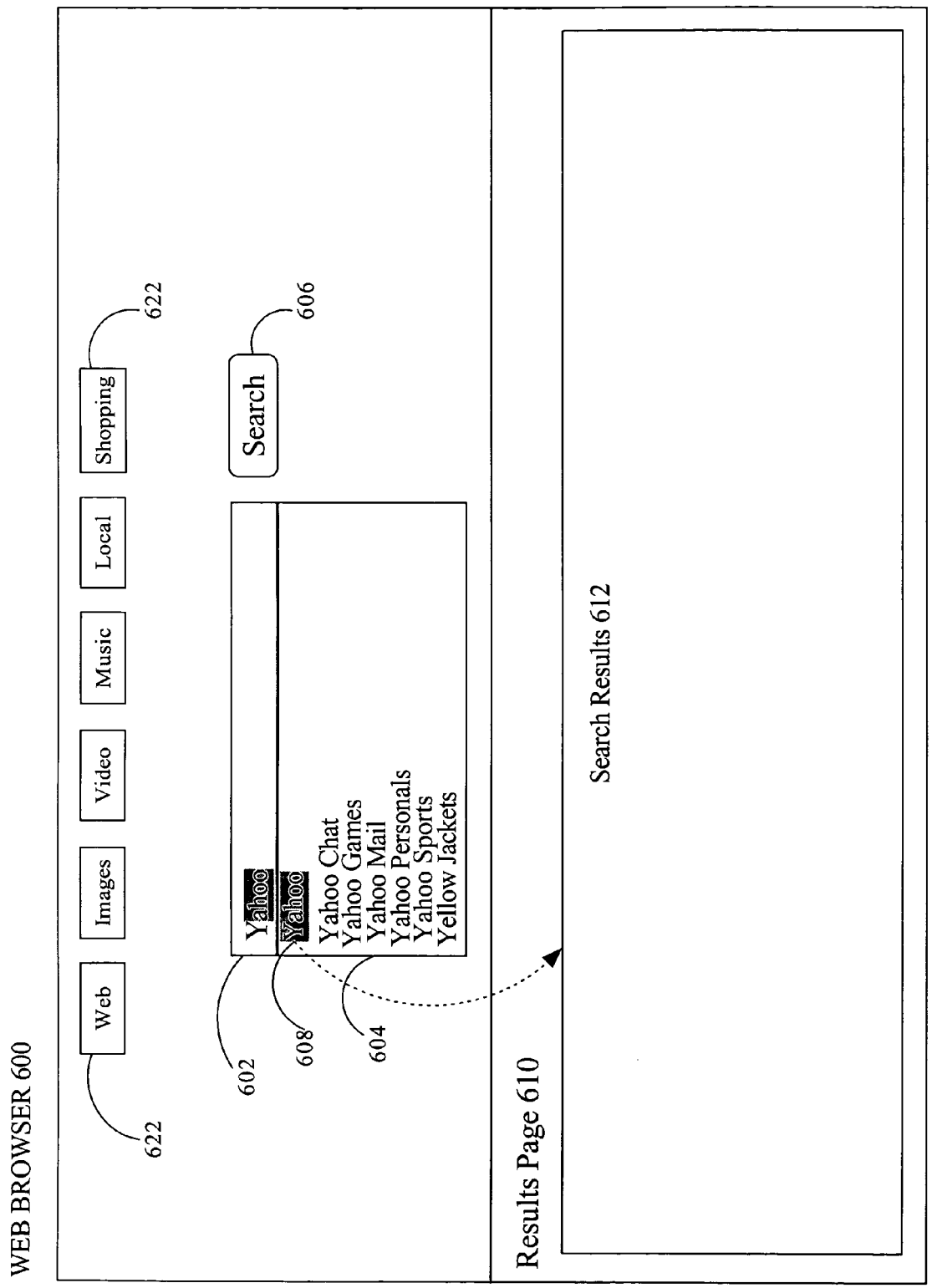
FIG. 6 illustrates a user interface that displays predicted queries based on input entered in a query field, and search results from the most likely predicted query, according to one embodiment of the present invention.

FIG. 6 illustrates a user interface display, predicted queries, and search results, according to one embodiment of the invention. A user, via a web browser 600, enters characters, which will constitute the user's intended query, into a query field 602. As soon as the first character is entered, and for every subsequently entered character, that portion of the intended query is sent to a query predictor, described below (also see FIGS. 8A-C). The query predictor determines a set of one or more predicted queries based on the partial query. The predicted queries are sent back to the user and displayed, for example in a drop box 604. The web browser 600 also displays a selected predicted query 608 (hereinafter referred to as the "particular predicted query").

A search engine processes the particular predicted query 608 from the set of predicted queries and sends the search results 612 to the user to be displayed, for example in results page 610. It is thus possible that the user only has to enter one or a few characters before the actual intended query is determined and the results of the intended query are displayed. Therefore, search button 606 may never have to be selected in order for an intended query to be issued.

Query Predictor

In one embodiment of the invention, the portion of the query entered so far by a user is sent from the user's web browser to a query predictor across a network. This may occur for each character, or sequence of characters, entered by the user. The query predictor examines the one or more characters and makes one or more predictions on what the intended query is. The one or more predictions are in the form of one or more completed queries, each of which was a previously issued query. These one or more predictions are sent to and displayed on the user's computer; effectively assisting the user in formulating a query before the user is finished typing the entire intended query in the query field.

The basic assumption behind the query predictor is that it is highly probable that a user intends to issue a query in which at least one other person has issued previously. By using that information, a highly interactive search engine may assist the user in formulating a query, or perhaps aiding the user in refining a query by listing other possible variants of the query that the user would be interested in. Every previously issued query is saved and logged because, if the query was valuable to one user, it has potential value for another user.

In one embodiment, the query predictor extends to other languages and is not exclusive to English. The query predictor may also support other types of strings, such as product names and part numbers where the user may only know a small piece of it.

"Smart" Lexical Completion

The query predictor thus has a searchable database of queries that the query predictor may access once the query predictor has received one or more characters from the user. Based on the partial query, the query predictor determines one or more completed queries from the database of queries that match lexically. However, instead of simply completing the partial query lexically and returning only those queries that begin with the character or characters in the partial query, other queries are also found that contain the lexical completion anywhere in the predicted query. For example, if a user enters the string "th", not only may "theory of evolution" be a predicted query sent to the user, but also "string theory" or "music theory," each of which are not simple lexical completions of "th."

Frequency and Time

In some situations, many previously issued queries may begin with "th." It has been determined that the most useful queries are likely the ones that not only have issued most often (popularity), but also those that have been issued most recently (temporal relevance). Therefore, in one embodiment of the invention, the query predictor biases the resulting set of predicted queries based on their frequency (i.e., number of times the query has issued in the entire query database history), and how often they were issued within a specified time, for instance, within the past week. The fact that the most recently issued queries are biased is based on the premise that a user is more likely to be interested in a subject that many other people are interested in at roughly the same time.

As an example, although "renewable energy sources" may have issued as a query five times more often than "nuclear energy," the partial query "ener" will cause the query predictor to generate "nuclear energy" as the particular predicted query because "nuclear energy" may have been issued much more frequently in the last week due to a hypothetically recent announcement by Congress that 100 nuclear reactors will be constructed.

Figure 7:
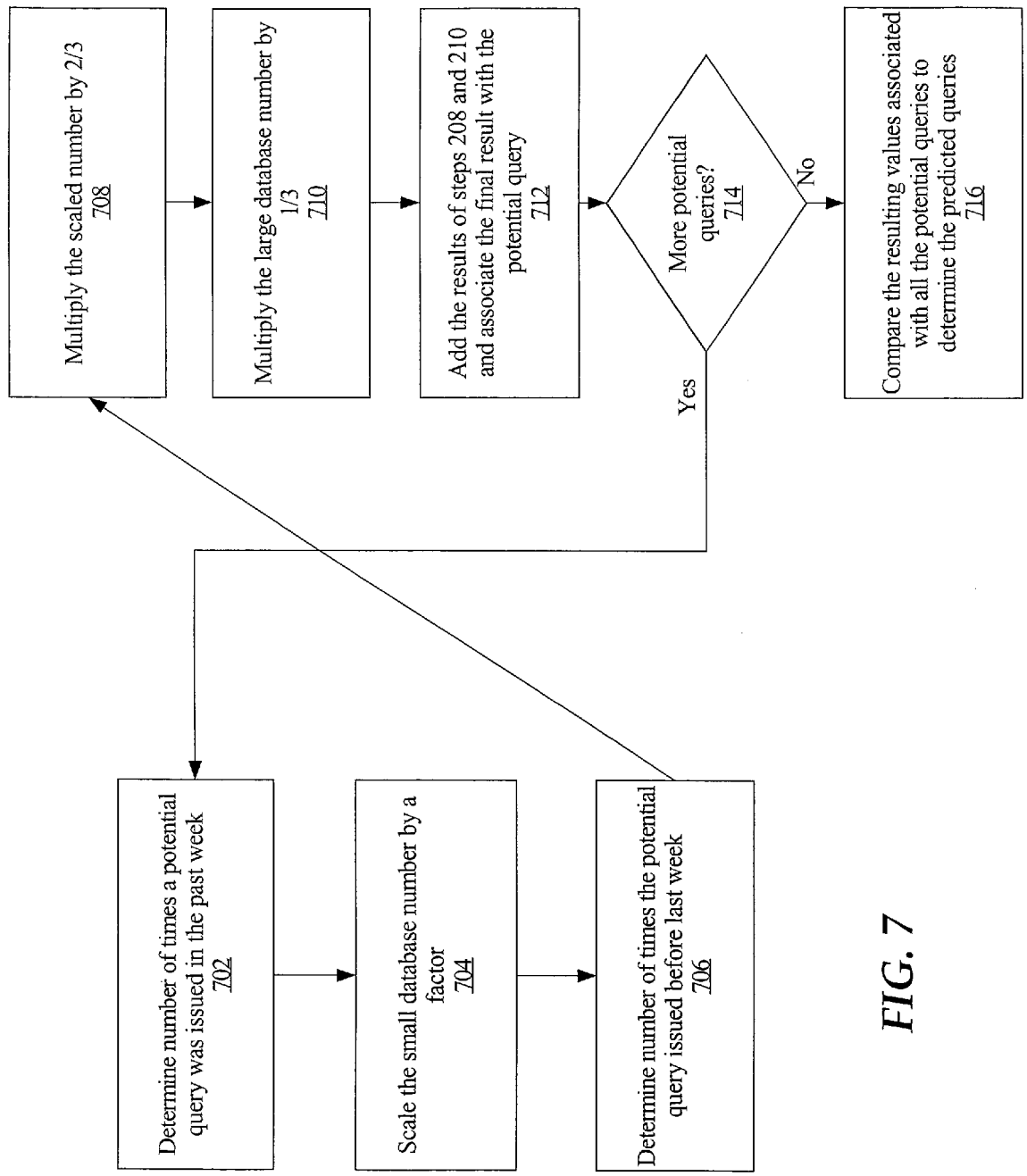
FIG. 7 is a flow diagram that illustrates how temporal relevance is factored into determining which potential queries become predicted queries sent to the user, according to one embodiment of the present invention.

In one embodiment, the time component is determined by searching at least two databases, one for relatively recent queries and one for relatively older queries, and then scaling the results from searching the recent database and weighting them accordingly. FIG. 7 illustrates steps in which this embodiment may be implemented. It will be apparent that there are many ways this scaling and weighting may be performed, in addition to the number of "old" query databases and "new" query databases, as the invention is not limited to this particular example. In this embodiment, the query predictor has access to a small database of all queries that issued in the last week and to a large database of all queries that issued before a week ago. When searching the small database for potentially valuable predicted queries, the number of times a potential query is found in the small database is scaled based on a factor. This factor is the ratio of the number of times a moderately popular query is found in the large database to the number of times that same moderately popular query is found in the small database. For example, suppose that "Yahoo" is a moderately popular query over the last week and over the past few years. If "Yahoo" is found in the large database 1.7 million times, and 25 thousand times in the small database, then the factor would be 1.7 million/25 thousand, or 68.

Query prediction would be less effective if a moderately popular query in both the small and large databases were not used to scale. If a query was popular only in the large database and but not in the small database, then the scaling factor would be skewed. For example, if the query "floppy disk" were used as the scaling factor and it was queried many times in the history of the large database but was queried only a few times in the previous week, for the simple reason that no one produces or uses floppy disks anymore, then the ratio between the large and small databases would be enormous. This would skew the results of a partial query by heavily weighting relatively recent queries to the detriment of relatively older, and potentially more valuable, queries.

A similar problem would exist if a new query was used as the scaling factor that was only issued in the past week but rarely issued in the history of the large database. For example, "nuclear energy" may be an infrequently issued query in the past. But, because of a hypothetically recent announcement by Congress that 100 nuclear reactors will be constructed, the query "nuclear energy" will likely be issued thousands, if not hundreds of thousands of times. In that case, the scaling factor would be quite small; and when a query in the small database is weighted against the queries in the large database, then relatively older predicted queries, rather than relatively newer, and potentially more valuable, predicted queries, would most likely be returned to the user.

Therefore, referring to FIG. 7, after the query predictor determines, in step 702, the number of times a given potentially valuable query was issued in the small (i.e. recent) database, the number is scaled, in step 704, by 68, which is based on the scaling factor determined above with "Yahoo" as the scaling query. The resulting scaled value essentially indicates that the potential queries in the small database are equal in weight to the potential queries in the large (i.e. old) database. Subsequently, the query predictor determines, in step 706, the number of times the potential query appears in the large database of "older" queries.

At this point, a weight is applied to the potential queries in the small database versus the potential queries in the large database. This is performed by multiplying the result of the scaled small database number by ⅔ and adding it to the result of multiplying the number of times the potential query was found in the large database by ⅓ (see steps 708-712). Steps 702-712 are performed for each potential query determined by the query predictor. When there are no more potential queries to process (714), all the potential queries are then compared with each other (step 716) based on their respective values determined for each potential query at step 712. The two or more queries (e.g., ten) with the highest values become the predicted queries, which are subsequently sent to the user.

Search Engine

In one embodiment of the invention, the search engine component processes the particular predicted query (i.e. the most likely intended predicted query) that a user would be interested in. The particular predicted query is processed to obtain search results. The search engine that may be used for this purpose is common in the art and requires no further description.

The search results obtained by the search engine are sent to and displayed on the user's computer. If the particular predicted query is the user's intended query, the search results based on the particular predicted query may appear on the user's monitor even before the user enters another character in the query field and very likely before the user finishes entering the full intended query. If the particular predicted query is not the user's intended query, then the user may select a different predicted query in the list or continue typing, at which time a new set of search results, based on the selected or new particular predicted query, will be displayed via the user interface.

Providing Predicted Queries and Search Results

Figure 8A:
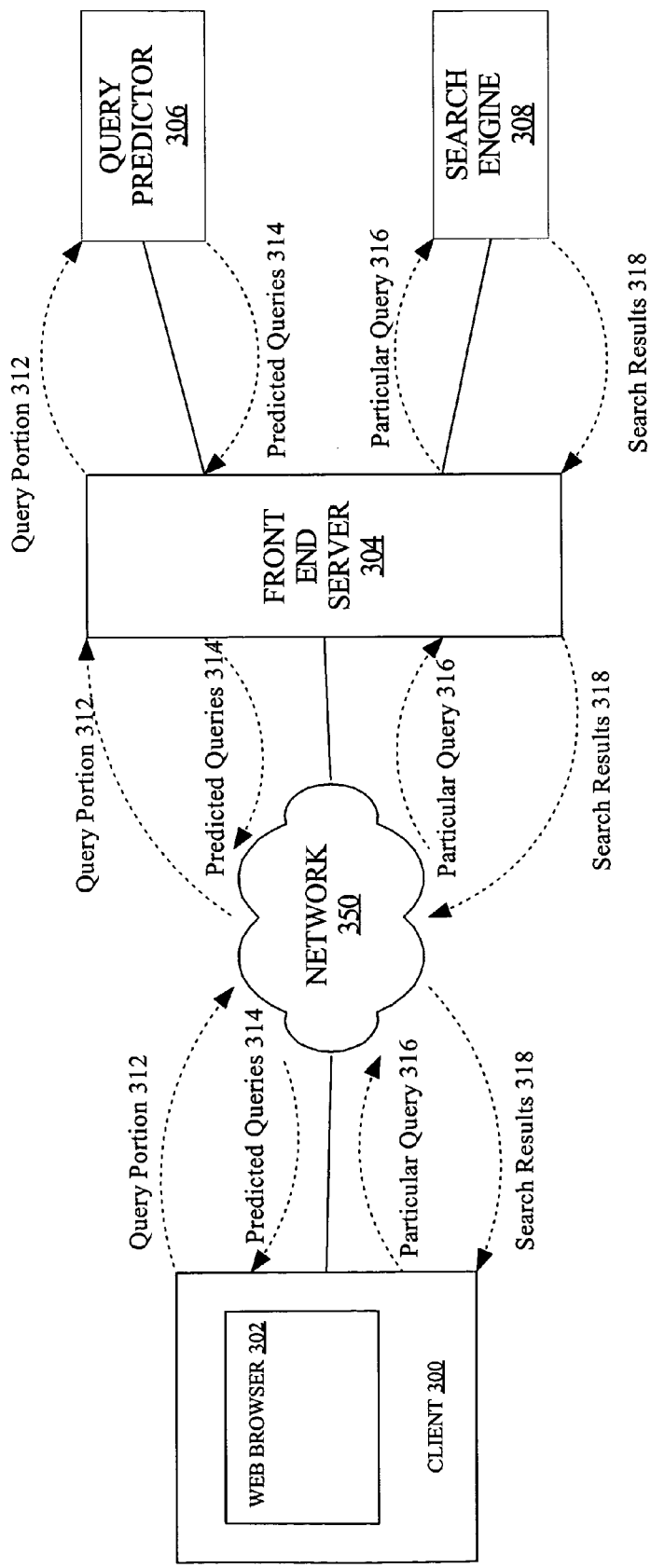
FIG. 8A is a block diagram that illustrates the communication between a web browser on a client and a front end server, according to one embodiment of the present invention.

FIG. 8A is a block diagram that illustrates one way a partial query is processed and how the results of the partial query are returned, according to one embodiment of the invention.

A user at a client 800 enters a partial query in a web browser 802. The partial query 812 is sent to a front end server 804 over a network 850. Front end server 804 is not a necessary element in any embodiment of the invention. Its main purpose is to add security to the interactive search engine system. Network 850 is also not a required element in any embodiment, but is merely illustrated to show one approach in which the invention may be implemented. Network 850 may be a local area network (LAN), a wide area network (WAN), or the Internet. Front end server 804 forwards partial query 812 to a query predictor 806, discussed above, which processes the partial query.

Front end server 804, query predictor 806, and a search engine 808, or any combination thereof, may be implemented on the same device. However, for the purpose of illustration and simplification, they each reside on different devices.

Query predictor 806 determines a set of one or more predicted queries based on the partial query and sends them 814 back to front end server 804. Along with the set of predicted queries, query predictor 306 sends additional data indicating which of the predicted queries in the set is the particular predicted query. Either query predictor 806 determines which predicted query is the particular predicted query or web browser 802 is given sufficient information to make that determination. Front end server 804 then forwards the predicted queries 814 and the data indicating the particular predicted query to client 800 over network 850 to be displayed on web browser 802.

Upon receipt of the set of predicted queries, web browser 802 sends particular predicted query 816 over network 850 to front end server 804, which forwards particular predicted query 816 to search engine 808. Search engine 808, described above, processes the particular predicted query to obtain search results. The search results 818 are finally sent to front end server 804, which forwards them 818 to client 800 over network 850.

One advantage of this implementation is that the predicted queries are sent immediately to the user as soon as they are determined. However, this implementation also illustrates the possibility that for every character the user types into the query field of his web browser, there are two complete round trips that a communication has to make between client 800 and front end server 804.

Figure 8B:
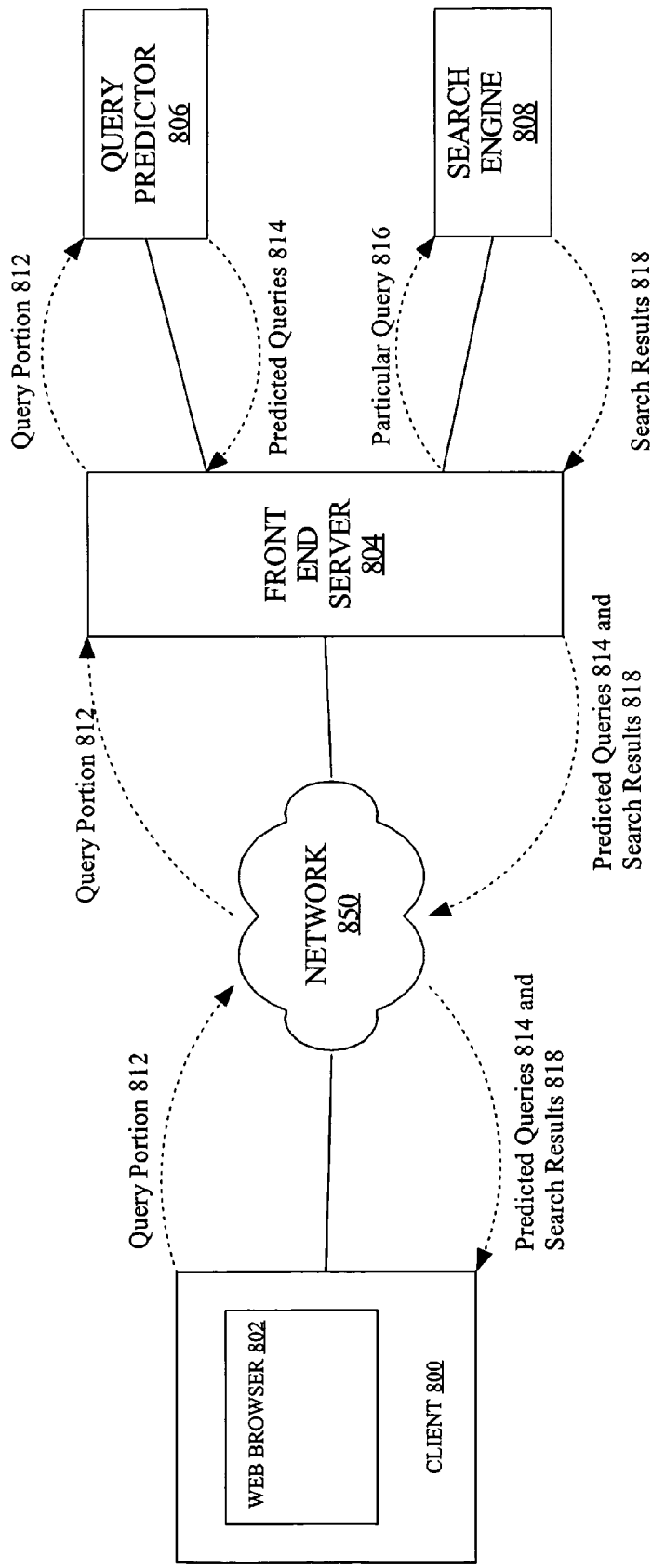
FIG. 8B is a block diagram that illustrates the communication between a web browser on a client and a front end server, according to another embodiment of the present invention.

FIG. 8B is a block diagram that illustrates a different way in which a partial query is processed and how the results are returned to the user, according to another embodiment of the invention.

A user at client 800 enters a partial query in a web browser 802. Partial query 812 is sent to front end server 804 over a network 850. Front end server 804 forwards partial query 812 to query predictor 806, which processes the partial query.

Query predictor 806 determines a set of one or more predicted queries based upon the partial query and sends them 814 to front end server 804. Instead of immediately forwarding the predicted queries to client 800, front end server 804 retains the predicted queries and sends search engine 808 the particular predicted query 816. Again, along with the set of predicted queries, query predictor 806 sends additional data indicating which of the predicted queries in the set is the particular predicted query. Either query predictor 806 determines which predicted query is the particular predicted query or front end server 804 is given sufficient information to make that determination.

Search engine 808 processes the particular predicted query to obtain search results. The search results 818 are sent to front end server 804, at which time front end server 804 forwards both predicted queries 814 and search results 818 to client 800 over network 850.

In the absence of front end server 804, query predictor 806 sends the predicted queries 814 and to search engine 808, which subsequently sends the predicted queries 814 and search results 818 to client 800 over network 850.

One advantage of this implementation is that there is less communication (i.e., traffic) between client 800 and front end server 804. However, the predicted queries may not display on the user's web browser 802 as quickly as in the previous embodiment because the predicted queries must "wait" for the search results to be produced and sent to front end server 804 before the predicted queries are forwarded to client 800.

Figure 8C:
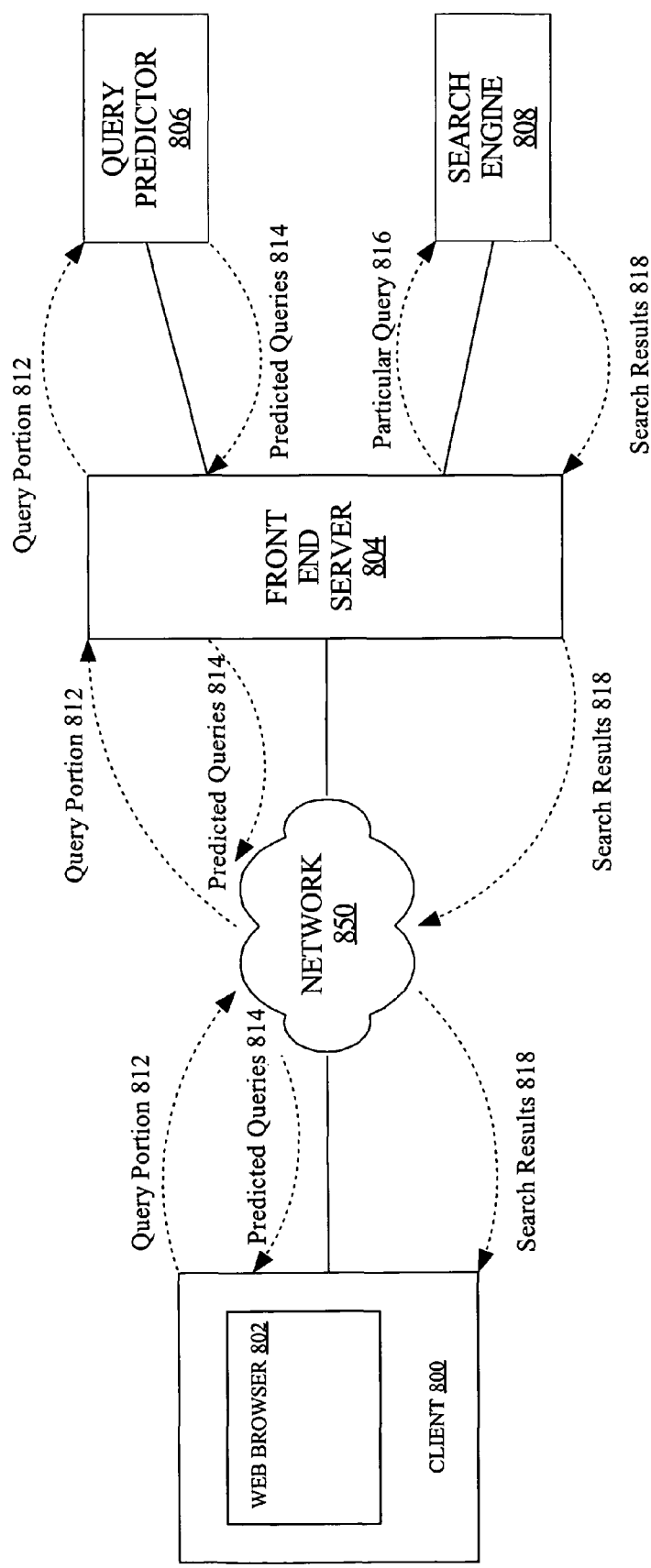
FIG. 8C is a block diagram that illustrates the communication between a web browser on a client and a front end server, according to another embodiment of the present invention.

FIG. 8C is a block diagram that illustrates a different way in which a partial query is processed and how the results are returned to the user, according to another embodiment of the invention.

A user at client 800 enters a partial query in a web browser 802. Partial query 812 is sent to front end server 804 over network 850. Front end server 804 forwards the partial query 812 to query predictor 806, which processes the partial query.

Query predictor 806 determines a set of one or more predicted queries based upon the partial query and sends them 814 to front end server 804. Again, along with the set of predicted queries, query predictor 806 sends additional data indicating which of the predicted queries in the set is the particular predicted query. Either query predictor 806 determines which predicted query is the particular predicted query or front end server 804 is given sufficient information to make that determination.

Instead of "holding on" to the predicted queries, as in the last embodiment, front end server 804 sends the predicted queries 814 to client 800 over network 850 and sends particular predicted query 816 to search engine 808 at substantially the same time. It is also possible for query predictor 806 to send the particular predicted query to search engine 808 directly.

Search engine 808 processes the particular predicted query to obtain search results. The search results 818 are sent to front end server 804, at which time front end server 804 forwards search results 818 to client 800 over network 850. In the absence of front end server 804, query predictor 806 sends both the predicted queries 814 and the particular predicted query 816 to search engine 808, after which search engine 808 sends predicted queries 814 and search results 818 to client 800 over network 850.

In the absence of front end server 804, query predictor 806 sends both predicted queries 814 and the particular predicted query 816 to search engine 808, which subsequently sends predicted queries 814 and search results 818 to client 800 over network 850.

The advantage of this implementation compared to the embodiment described in FIG. 8A is that there is less traffic between client 800 and front end server 804. The advantage compared to the embodiment described in FIG. 8B is that the predicted queries do not have to "wait" for the search results to be produced and sent to front end server 804 before the predicted queries are forwarded to client 800. Thus, the predicted queries are sent immediately upon their production and less communication is required between client 800 and front end server 804.

User Interface

In one embodiment of the invention, as illustrated in FIG. 6, the user interface includes at least 1) a query field 602 where a user enters characters that will constitute the partial query, 2) a drop down box 604 that lists the set of one or more predicted queries, 3) a search results page 610, and 4) a "Search" button 606. The search button may be in the form of any mechanism that allows the user to select the query the user enters, in case the user is not satisfied with any of the predicted queries provided by the interactive search engine. The set of predicted queries listed in drop down box 604 may be represented in almost any other type of user interface element, including, but not limited to, a text box, list box, menu, or context menu. The user interface may be viewed using a web browser, such as INTERNET EXPLORER or MOZILLA FIREFOX.

In one embodiment, the set of predicted queries are listed, beginning at the top, in order of the most likely predicted query to the least likely predicted query.

Modifications

In addition to the user interface, query predictor, and search engine described above, the interactive search engine may be modified in many ways to alter the look, feel, and responsiveness of the search experience.

Tabs

For instance, the user interface includes tabs, such buttons or links 622 in FIG. 6, wherein the user may select a subsection of possible queries and search based on that subsection. With a collection of tabs or "search verticals," such as "Web," "Images," "Video," and "Shopping," a user may select different query sets. The data for which the query predictor is predicting is different based on what the user is interested in, which data is narrowed by using these tabs. For example, if the user is interested in shopping for a product, the user selects the "Shopping" tab. The user then begins to enter a product name or service in query field 602. The query predictor is not only sent the partial query but also the shopping selection information, indicating that the user is searching for a particular product or service, wherein the query predictor returns only those predicted queries that pertain to products and services.

Keywords

Often when a query is issued, the order of words in the query is unimportant. As alluded to earlier, the issued query does not have to be in English. In other embodiments, not only are other natural languages supported, but also non-natural strings, such as product names and part numbers where the user may only know a portion of the non-natural string. Therefore, the term "word" as used herein may include an English word, a Korean word, or a product number.

When a user enters two or more words in the query field, the user is not necessarily concerned that the search engine returns a link to a web accessible document that contains the two or more words in the order that they were entered. Rather, the user is interested in a web accessible document that merely contains those words, in whatever order they are found.

For example, a user enters "solar wind water power" in the query field. The user does not particularly care about the order. The user is rather interested in queries that contain the words "solar," "wind," "water," and "power" somewhere in the query. The query predictor determines what words are important in the query and which words are not important, and then predicts queries based on the important words instead of predicting queries based simply on a matching substring.

Delay Results

In another embodiment, the step of displaying the predicted queries and/or the search results is delayed. Instead of immediately returning predicted queries, the query predictor "waits" until certain criteria is satisfied (such as the lapse of a specified amount of time or when a few characters are entered, or both) before the predicted queries and search results are displayed. This additional step of waiting assumes that the user may not be sure what he/she wants to query on. Thus, the predicted queries are delayed until the interactive user interface determines, based on the waiting criteria, that this is what the user truly intends to query on. Once the waiting criteria are satisfied, the partial query is processed by the query predictor and the search engine, as described above.

Other Dynamic Data

There are additional ways to aid users other than to predict the intended query and return the appropriate search results. In another embodiment, advertisements that appear on the interactive user interface change based on the particular predicted query returned from the query predictor. Thus, every time the particular predicted query changes, new advertisements that relate to the query are posted on the user interface and advertisements that related to an older and non-relevant query are deleted from the user interface. For instance, if a user types "elli" and the query predictor determines "elliptical" as the particular predicted query, advertisements that relate to exercise equipment will appear on the user interface.

In addition to advertisements, other dynamic information may be useful to the user when submitting a query. In another embodiment, information relating to a particular predicted query but not found in the search results are displayed to the user via the user interface. Extending the "theory" example used above, the query predictor determines that "theory" is the particular predicted query for the partial query "th" entered by the user. The query predictor, or perhaps another program, determines that "theory" is associated with "string theory," "music theory," and "math theory" and returns these related subjects to be displayed in the form of predicted queries or in a different form on the user interface. For short queries like "theory," this additional information happens to be the same set as what the query predictor would produce.

However, if the user entered "interna" in the query field and the query predictor determined that the particular predicted query is "international trade" then the query predictor, in addition to the predicted queries, would return queries that are not lexical completions of "international trade," but rather queries related to the topic of international trade. Such queries could be on GATT, WTO, UN, US trade policies, etc. A program separate from the query predictor could also perform this function.

Clearly, this aspect of the invention is not performing query prediction, but rather is providing the user with dynamic, related, and hopefully helpful information. A principle in providing advertisements, additional queries, and other related information is to keep everything that is displayed via the user interface consistent with what the query predictor "believes" is the user's intent, which the query predictor determines from the partial query.

Alternatives to Predicted Search Queries

Overview

Techniques have been described for predicting what a user search query will be when completed. The search query thus predicted is referred to herein as the "predicted search query". According to one embodiment, after determining the predicted search query, the search engine goes on to determine and provide to the user one or more alternatives to the predicted search query. Such alternative queries are referred to herein as "alternative search queries". Each of the alternative search queries is based, at least in part, on the predicted search query, but differs in some manner from the predicted search query.

Unlike the predicted search query, the alternative search queries are not predictions of what the user query will look like when completed. In fact, alternative search queries are often something that the partially-formed user search query is unlikely to complete to. For example, in response to the user entering a search query of "brittany sp", the predicted search query may be "brittany spears", but the alternative search query may be "britney spears". In this example, it is highly unlikely that the completed version of "brittany sp" would be "britney spears", since "britney spears" could only be produced if the user backtracks and changes the spelling.

In accordance with an embodiment of the present invention, the alternative search queries are determined as follows: A search query is received from a client node. Prior to receiving an indication from the client node that the search query is completely formed, the following steps are performed: 1) a predicted search query is determined by predicting what the search query will be when completed; and 2) an alternative search query that differs from the predicted search query is determined based on the predicted search query. The alternative search query is provided to the client node.

The alternative search query may be based on an alternative spelling (or spelling suggestion) of the predicted search query. The alternative search query may be a closely related search query to the predicted search query. For example, if the predicted search query is an acronym, the alternative may be an expansion of the acronym. Another example of closely related search queries is "movie times" and "show times".

Example User Interface

Figure 9:
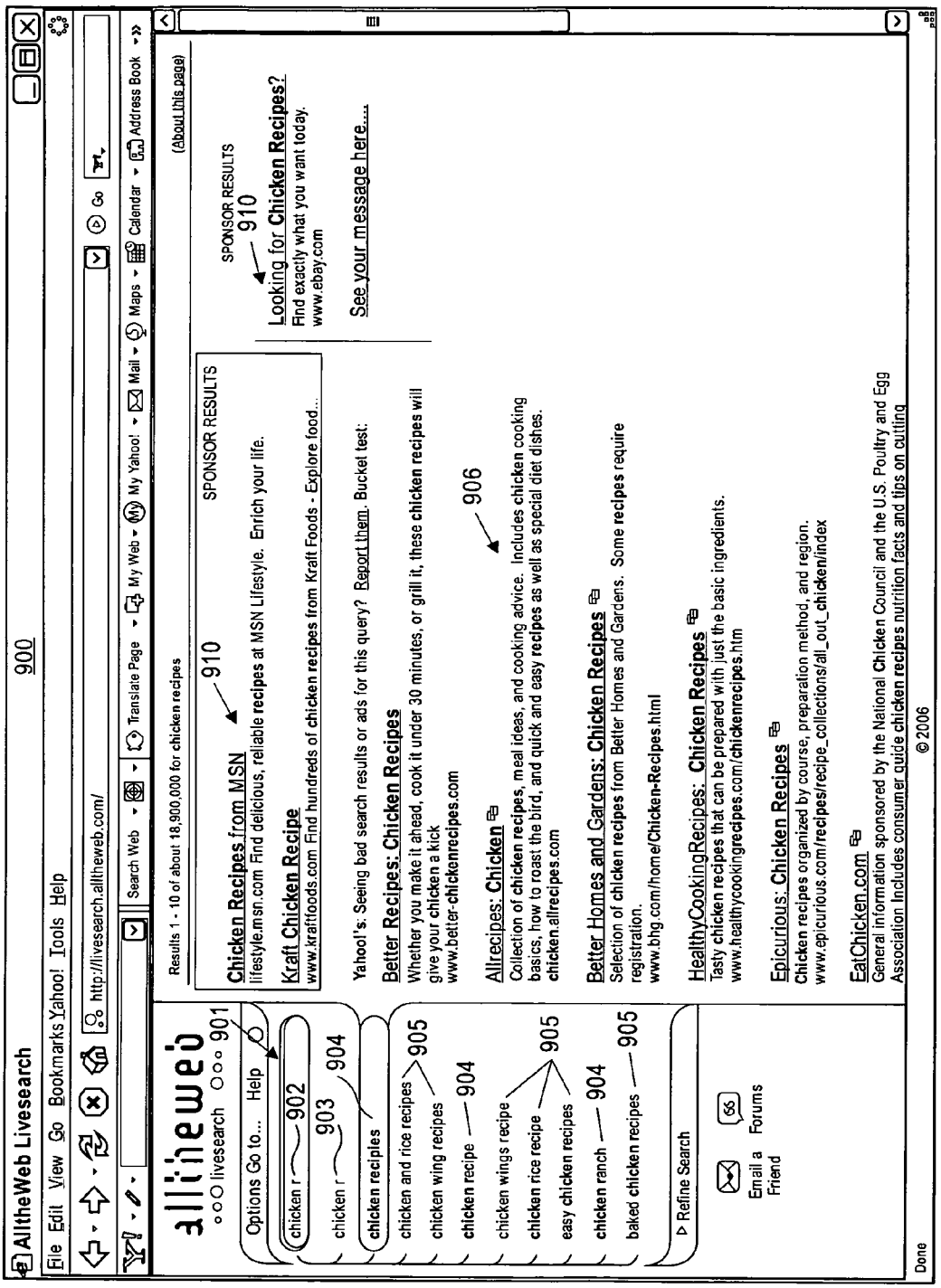
FIG. 9 depicts an example user interface for displaying alternatives to a predicted search query, in accordance with an embodiment of the present invention.

FIG. 9 depicts an example user interface 900, in accordance with an embodiment of the present invention. The user interface has a search box 901 in which a user has entered a user search query 902 of "chicken r". Below the search box 901 is a list of search queries that is provided to the user in real time as the user enters the user search query 902. The list of search queries includes a mirrored version 903 of the user search query 902. Below the mirrored version 903 is an area that contains predicted search queries 904 and alternative search queries 905, both of which are determined, directly or indirectly, based on the user search query 902, in accordance with an embodiment of the present invention. The predicted search queries 904 and alternative search queries 905 are ranked based on expected relevancy to the user search query 902, in accordance with one embodiment. Higher ranked search queries may be presented higher in the list.

The predicted search queries 904 "chicken recipes", "chicken recipe", and "chicken ranch" are predictions of what the user search query 902 will be when completed. The alternative search queries 905 are determined based on a predicted search query 904, in accordance with an embodiment of the present invention. As an example, the search query "chicken and rice recipes" is an alternative to the predicted search query "chicken recipes". Note that the alternative search queries 905 are formed by adding characters other than at the end of the user search query 902. Other alternative search queries 905 include "chicken wing recipes", "chicken wings recipe", "chicken rice recipe", "easy chicken recipes", and "baked chicken recipes".

The user interface 900 has search results 906 that contain links to documents (e.g., web pages) that satisfy one or more of the search queries. In this example, the search results 906 pertain to the predicted search query "chicken recipes", which has the highest relevancy ranking of the predicted search queries 904 and alternative search queries 905. These search results are provided to the user by default without the user requesting search results for that particular search query, in one embodiment. However, search results can be provided for any of the search queries, including any of the alternative search queries 905. Note that there is no button for the user to submit a search query, in this example user interface 900. The user can change which search results are displayed by scrolling through the list of search queries (including the mirrored search query 903), in one embodiment.

The user interface 900 has other areas for displaying results related to the search queries, such as sponsor provided areas 910. Results related to either predicted search queries 904 or alternative search queries 905 may be displayed in the sponsor provided areas 910.

Flow for Determining Alternatives to Predicted Search Queries

Figure 10:
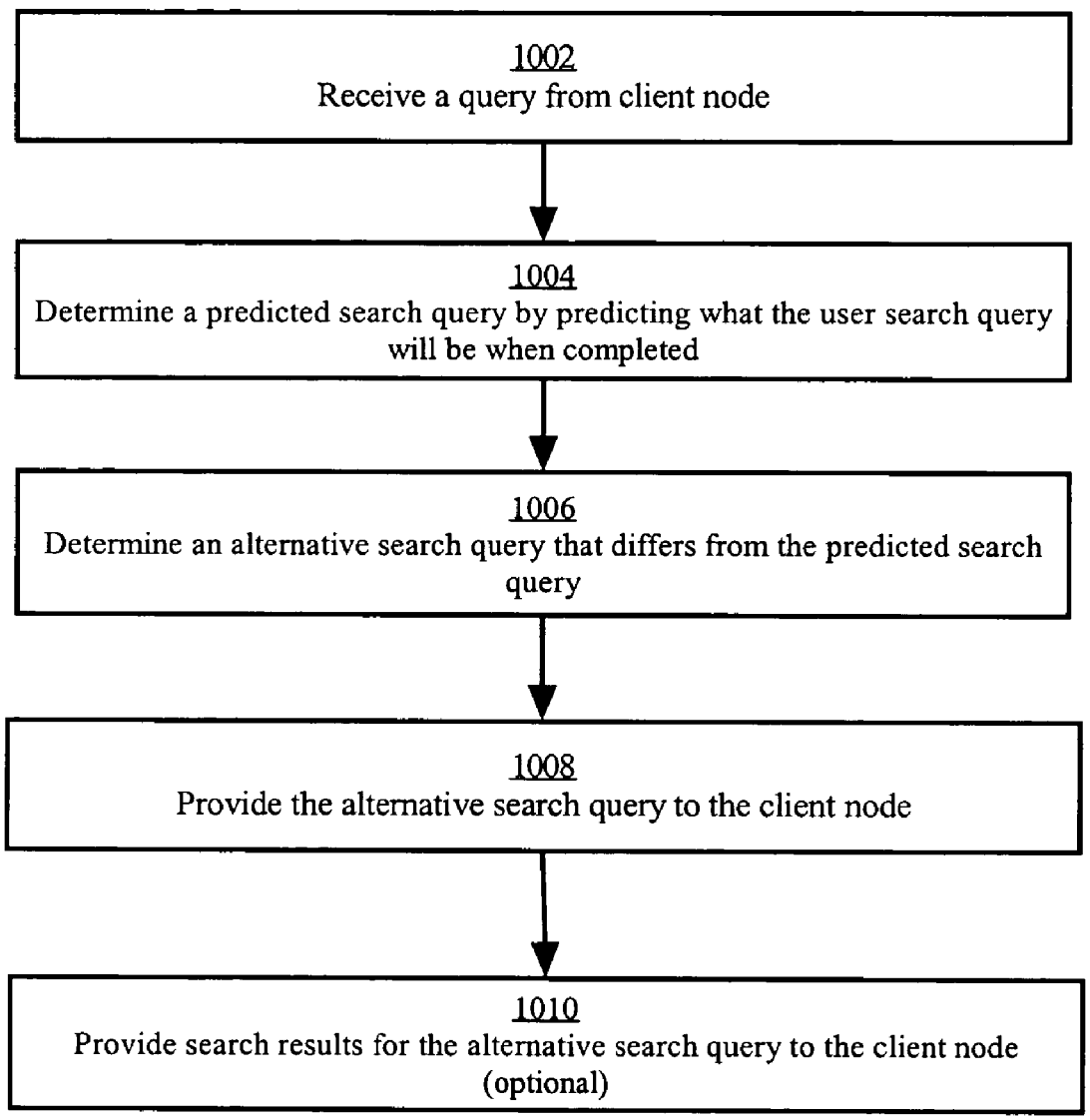
FIG. 10 is a flowchart illustrating steps of a process of determining alternatives to a predicted search query, in accordance with an embodiment of the present invention.

FIG. 10 is a flowchart illustrating steps of a process 1000 of determining alternatives to a predicted search query, in accordance with an embodiment of the present invention. Process 1000 will be discussed in connection with the client/server system of FIG. 8A, and the example user interface of FIG. 9; however, process 1000 is not so limited.

In step 1002, a search query is received from a client node. For example, the example user interface 900 of FIG. 9 is part of a web browser 802 or the like that executes on a client node 800. As an example, the user enters the search query "chicken r", which is forwarded to a server 804.

In step 1004, one or more predicted search queries are determined by predicting what the search query will be when completed. Step 1004 is performed prior to receiving an indication from the client 800 that the search query is completely formed. For example, the query predictor 806 determines that, when completed, the user search query will be "chicken recipe" or "chicken recipes".

In one embodiment, the predicted search queries are determined by selecting search queries from a database of historically submitted search queries ("historic database"). For example, the historic database also stores the frequency with which each of the search queries were submitted, wherein the selection of predicted search queries is based on the frequency. In this example, the frequency with which users submitted the search queries "chicken recipes" and "chicken recipe" is sufficiently high to predict that the user search query will complete to one of these. The selection may be based on information other than, or in addition to, the frequency with which a search query was submitted in the past.

In step 1006, for at least one of the predicted search queries, at least one alternative search query that differs from the predicted search query is determined. Step 1006 is performed prior to the client 800 providing an indication that the search query is complete. For example, the alternative search query "chicken and rice recipes" is determined based on "chicken recipes". Other example alternative search queries are "chicken wing recipes", "chicken wings recipe", "chicken rice recipe", "easy chicken recipes", and "baked chicken recipes".

Note that in this example, the alternatives are not formed by adding characters to the end of the user search query. For example, words such as "wing" and "wings" are inserted into the middle of the string of characters of the user search query "chicken r". Also note that characters may be added before the user search query, as in the alternative search query "easy chicken recipes". Further details of how the alternative search queries are determined are discussed below.

In step 1008, at least one of the alternative search queries is provided to the client 800. In one embodiment, potential alternative search queries are ranked in accordance with predicted relevance to the user search query, wherein higher ranked alternatives are provided to the client 800. The alternative search queries are then displayed in the user interface 900, as shown in FIG. 9. Note that the alternative search queries are provided to the client 800 prior to the client 800 providing an indication that the search query is complete.

In optional step 1010, search results that satisfy one or more of the alternative search queries are determined and provided to the client 800. Other search results, such as results that satisfy one or more of the predicted search queries can be forwarded to the client 800. Results that satisfy one or more of the alternative search queries may be displayed as search results 906 in other regions of the user interface 900, such as a sponsor provided area 910.

Examples of Alternative Search Queries that are Generated Based on Predicted Search Queries The alternative search queries can be determined in a number of ways. The following sections describe several ways to determined alternative search queries. However, determining alternative search results to a predicted search query is not limited to these examples.

Based on Association with Highly Related Information

Some search queries, although perhaps quite different in structure, are related to one another. If a user enters one of these search queries, one or more of the related search queries may also be of interest. In some cases, the search queries may produce very similar search results. An example is the search queries "movie times" and "show times". Another example is the search queries "CIA" and "central intelligence agency". Some related search queries will not necessarily produce substantially similar results. For example, the search queries "flowers" and "wedding flowers" are related, although the search results may be quite different.

A) Acronyms

Figure 11A:
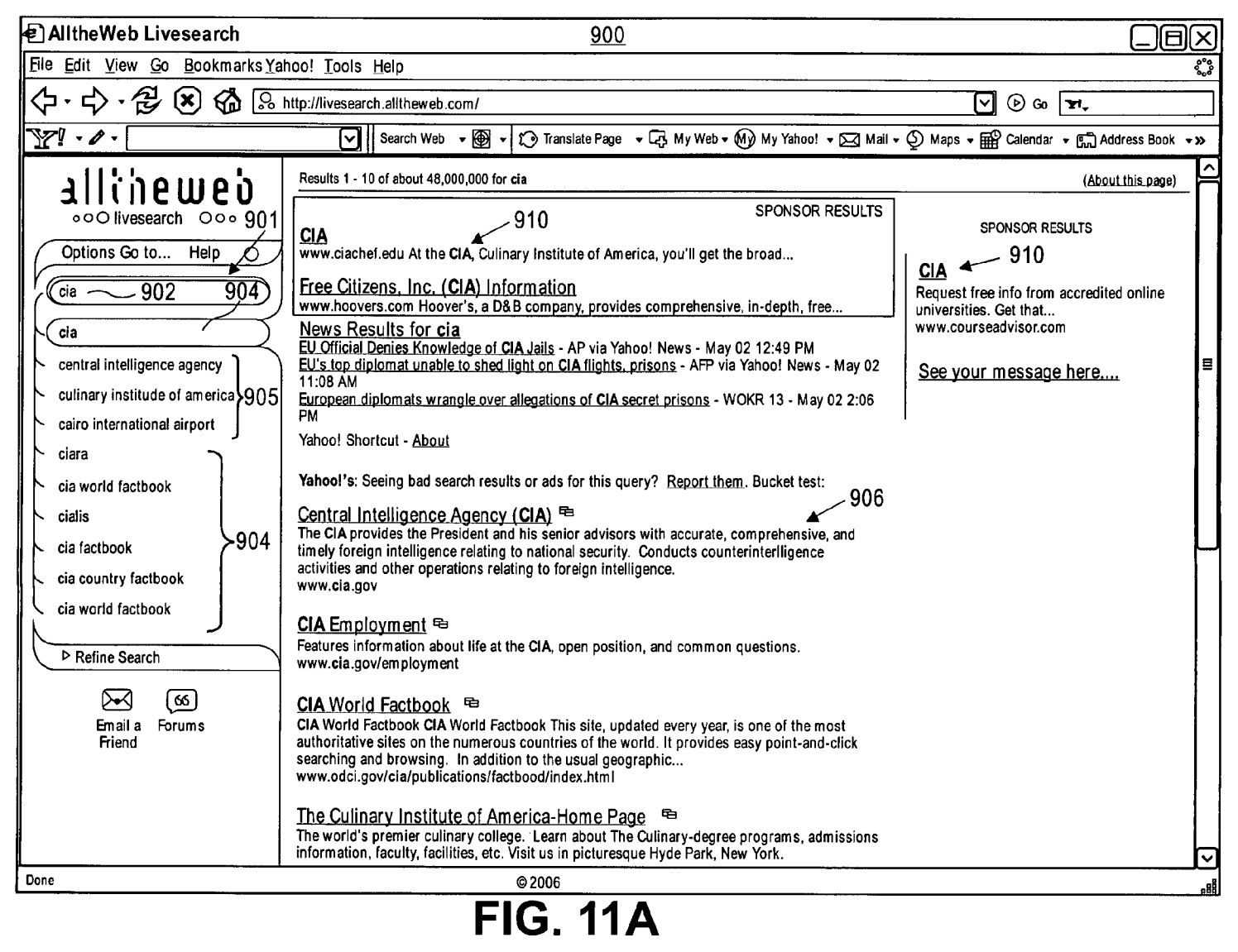

One way in which search queries may be related is when one contains an acronym for words that are spelled out in the other. FIG. 11A depicts a user interface 900, in accordance with an embodiment of the present invention. The search box 901 contains a user search query 902 of "cia". Prior to the user providing an indication that the search query 902 is complete, one or more predictions are made as to what the search query 902 will be when completed. In this case, predicted search queries 904 include "cia", "ciara", "cialis", "cia factbook", "cia country factbook", and "cia world factbook". Note that the predicted search query 904 "cia" is the same as the user search query 902, and thus also serves as a mirrored version of the user search query 902.

A determination of what a user search query will be when complete is based on an analysis of historic search queries, in one embodiment. For example, if the search query "cia" appears in the historic database with a sufficiently high frequency, then it is predicted as a complete search query, in one embodiment. A similar process applies to determining the other predicted search queries 904.

As previously discussed, alternative search queries are determined and provided to the client by an embodiment of the present invention. For example, one predicted search query 904 is "cia". In this example, one alternative search query 905 is "central intelligence agency". This alternative search query is based on recognizing that "CIA" is an acronym and expanding the acronym. The process can be reversed. In other words, if the predicted search query were "central intelligence agency", an alternative search query of "cia" could be provided to the client. Other alternative search queries 905 for the predicted search query 904 of "cia" are "culinary institute of america" and "cairo international airport".

The user interface 900 has search results 906 that contain links to documents (e.g., web pages) that satisfy one or more of the search queries. In this example, the search results 906 pertain to more than one of the search queries. For example, search results are provided that are relevant to the alternative search queries 905 "central intelligence agency" and "culinary institute of America".

B) Also Try

The alternative search query can also be based on an "also try" suggestion. An also try suggestion is based on search queries that are closely related with one another. An example of an also try query is suggesting the related search query "movie times" to a user search query of "show times". A database that has associations of closely related search queries ("also try database") is used to determine alternative search queries, in accordance with an embodiment of the present invention.

Figure 11B:
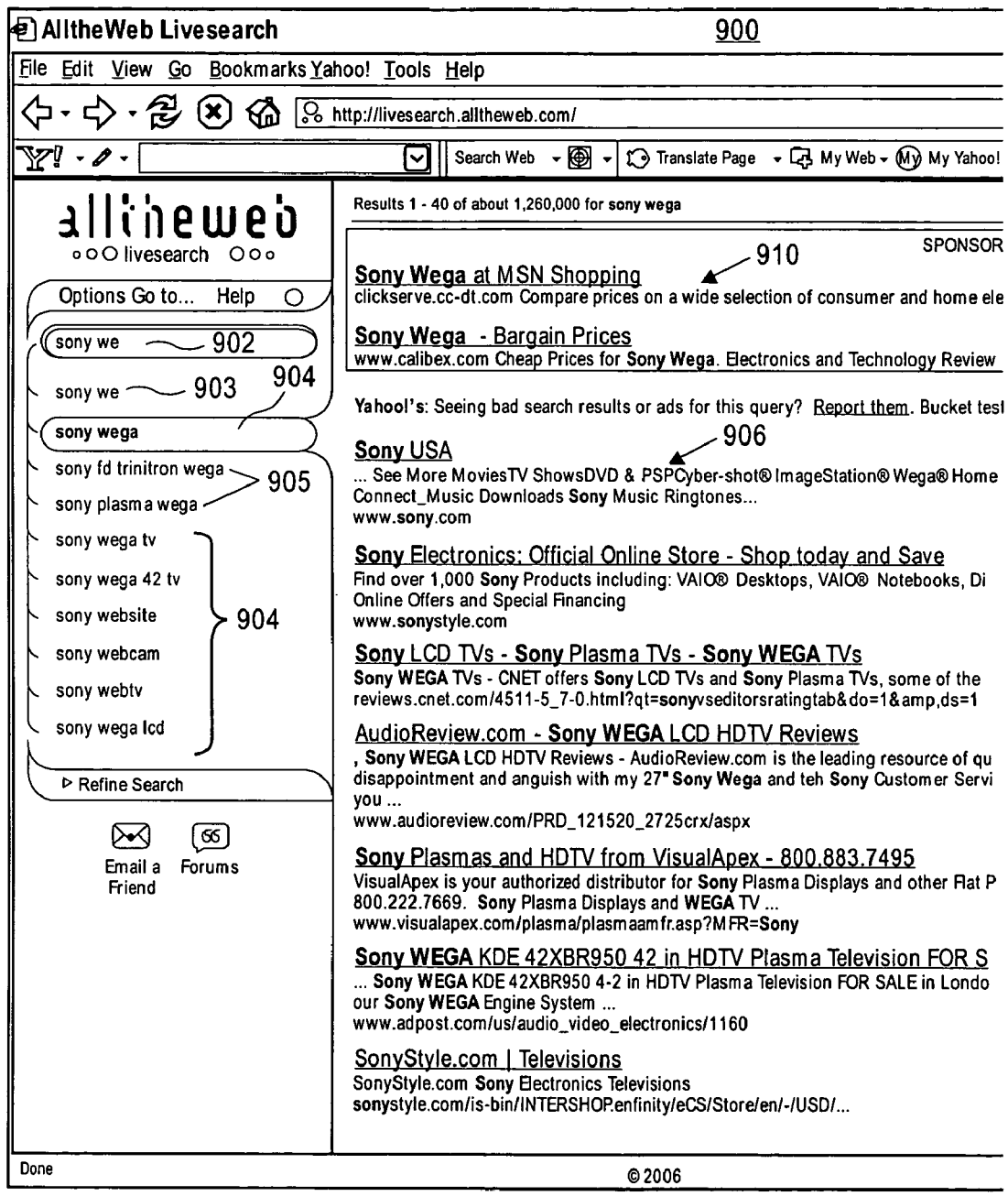

FIG. 11B depicts a user interface in which the user search query 902 is "sony we". Prior to the user entering an indication that the user search query 902 is completed, a prediction is made that the completed search query 904 will be "sony wega". Among the other predicted search queries 904 are "sony wega tv", "sony wega 42 tv", etc. Based on at least one of the predicted search queries 904, numerous alternative search queries 905 are suggested to the user. For example, the alternatives of "sony fd trinitron wega" and "sony plasma wega" are provide as alternative search queries 905.

Note that the alternative search query may contain one or more characters inserted in the body of the user search query. For example, "fd trinitron" appear in the body of the user search query 902 "sony we". This alternative can be determined by searching an also try database, although other techniques may be used. For example, any database that contains search queries that are associated or related with one another can be searched.

The alternative search query may also include characters that lead the body of the user search query. For example, if the user search query 902 is "flowers", a predicted completed search query could be "flowers". Based on this predicted search query, the alternatives of "wedding flowers", "pictures of flowers", etc. may be provided as alternative search queries. Note that none of theses alternative search queries could be formed by merely completing the user search query by adding one or more characters to the end of the user search query.

Referring again to FIG. 9, the user search query 902 is "chicken r". The alternative search queries 905 are determined based on search queries that are related to one of the predicted search queries 904 of "chicken recipe" or "chicken recipes", in accordance with an embodiment of the present invention.

Thus, alternative search queries that cannot be formed merely by adding characters to the end of the user search query are determined in accordance with an embodiment of the present invention.

Spelling Suggestions

A spelling suggestion is used to determine an alternative to the predicted search query, in accordance with an embodiment of the present invention. As previously discussed, a historic database of search queries that users have submitted can be generated. In one embodiment, the historic database is used to determine a prediction of what the user search query will complete to. When a user submits a search query that contains a misspelled term, that search query may initially be added to the historical database. However, search queries having misspellings are removed from the historic database, in one embodiment. Variations are discussed below that cover cases of whether a misspelled search query is in the historic database or not.

A spelling database is used to determine alternative search queries for user search queries that are potentially misspelled, in one embodiment. Entries in a spelling database comprise a first spelling of a term and at least one alternative spelling of the term. The spelling database may further have frequency information that can be used to select an alternative spelling of a term for a first spelling of the term. Examples are described below of how a spelling database may be used to determine alternative search queries.

Providing an alternative search query to a predicted search query based on a spelling suggestion may be performed in several different ways. Following are three different embodiments. However, providing an alternative search query to a predicted search query based on a spelling suggestion is not limited to the following embodiments.

A) Historic Database has Entry for the User Search Query

Figure 11C:
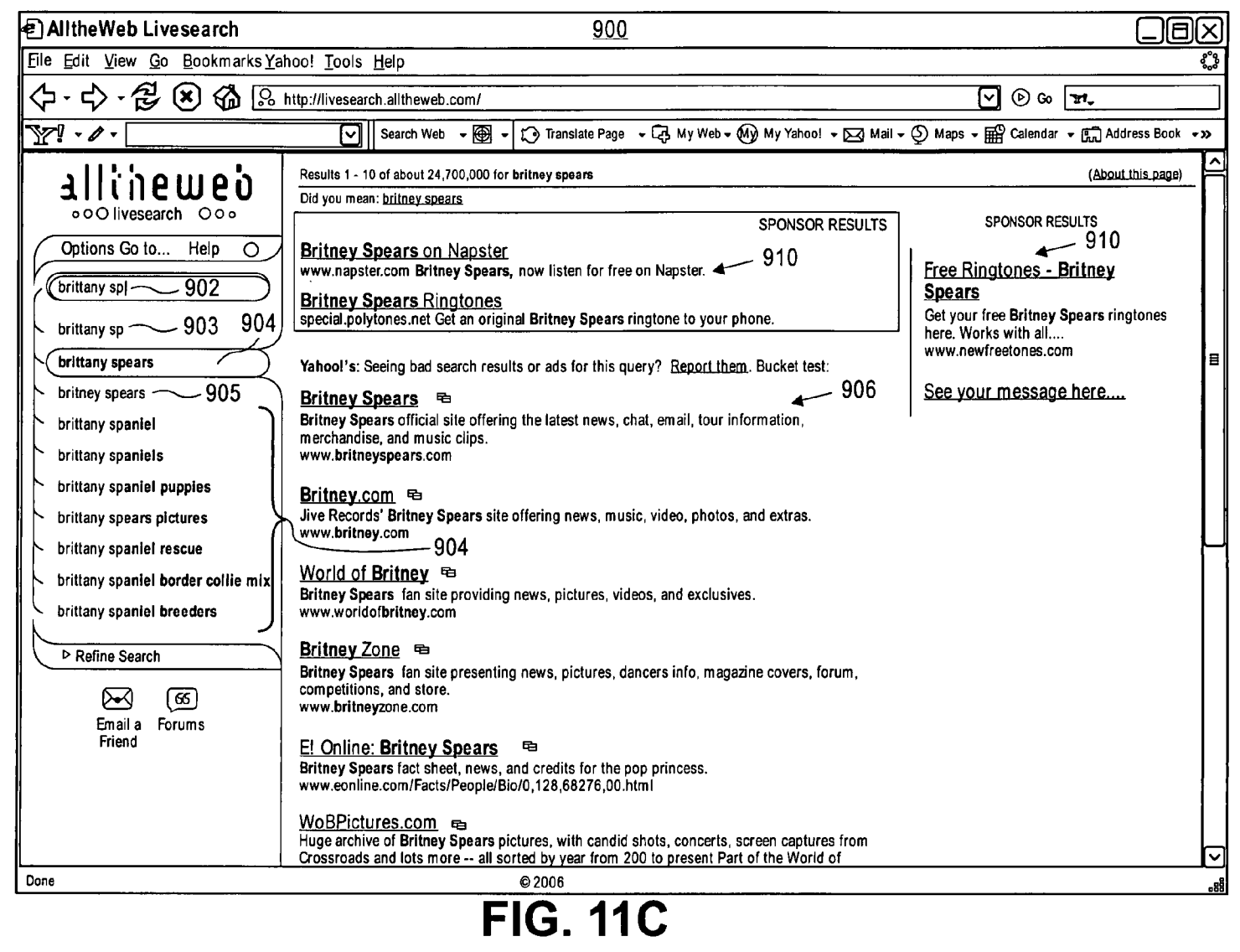

In FIG. 11C, the user has entered a user search query 902 of "brittany sp". This search query 902 is transferred to the query predictor (FIG. 8, 806), which predicts what this user search query 902 will be when completed. For example, a predicted search query 904 is "brittany spears". This prediction is based on a search of a database of historic search queries, in one embodiment. In this case, the historic database contains the misspelled search query "brittany spears". The predicted search query 904 is provided to the client.

Furthermore, an alternative search query 905 that is an alternative spelling for the predicted search query is determined, in the present embodiment. For example, the alternative search query 905 is determined by searching the spelling database using the predicted search query "brittany spears" as a key, in one embodiment. The alternative search query 905 "britney spears" is provided to the client, and thus is displayed in the user interface of FIG. 11C.

Additional predicted search queries 904 are also provided to the client in this example. For example, the search query "brittany spaniel" is provided to the user. Furthermore, search results 906 that satisfy one of the suggested search queries are provided to the user. In this example, the search results 906 for the alternative search query 905 "Britney Spears" are provided. Sponsor provided results 910 related to the alternative search query 905 are also provided.

B) Historic Database does not have Entry for the User Search Query, but Spelling Suggestion Database has Entry for the User Search Query As another example, if the user entered the search query "ritney spears", a prediction for the completed search query may be "ritney spears". In this example, the prediction may be made by searching the historic database and determining that the search query "ritney spears" is not present. Although users may have submitted this misspelling in the past, the entry for this particular misspelling may have been removed from the historic database. A prediction can be reached that "ritney spears" will be the completed user search query based on the fact that the historic database does not contain this search query, or any search query with additional characters that the user might add to the end.

Based on the predicted search query, the alternative search query of "britney spears" is determined and provided to the user. The alternative search query is determined by searching the spelling database using the predicted search query as a key, in one embodiment. In this example, the search term "ritney spears" is in the spelling database as a first search query and is associated with "britney spears".

C) Neither the Historic Database nor the Spelling Suggestion Database has Entry for the User Search Query As still another example, the user may have entered the search query "nkusp f". In this example, the historic database may not contain any entries that match this search query or could match with additional characters added to the end. Therefore, a prediction is made that this is the completed search query. For the sake of illustration, if the search query "nkusp f" does not appear in the spelling database, a spelling correction is not determinable using the present form of the user search query. In this case, the user search query is re-formed and a spelling correction is attempted on the re-formed user search query. For example, one or more characters on the right hand end of the user search query are removed. As a particular example, the term "nkusp" is searched for in the spelling database. For the sake of illustration, the spelling database associates the term "nakusp" with "nkusp". Therefore, the alternative search query "nakusp", which is a city in British Columbia, is provided to the client.

Note that the alternative search query "nakusp" may have been provided to the user prior to the user entering the "f" in the search query. However, on some occasions users will continue to type in more characters even after a suitable alternative search query has been provided.

Combinations to Determine Alternative Search Queries

An alternative search query can be based on a combination of one or more of the techniques discussed herein. For example, the alternative search query is formed by applying an alternative spelling to a predicted search query and then further modifying the alternative spelling. For example, the alternative spelling may be an acronym. The acronym can be expanded to generate one or more alternative search queries.

Hardware Overview

Figure 12:
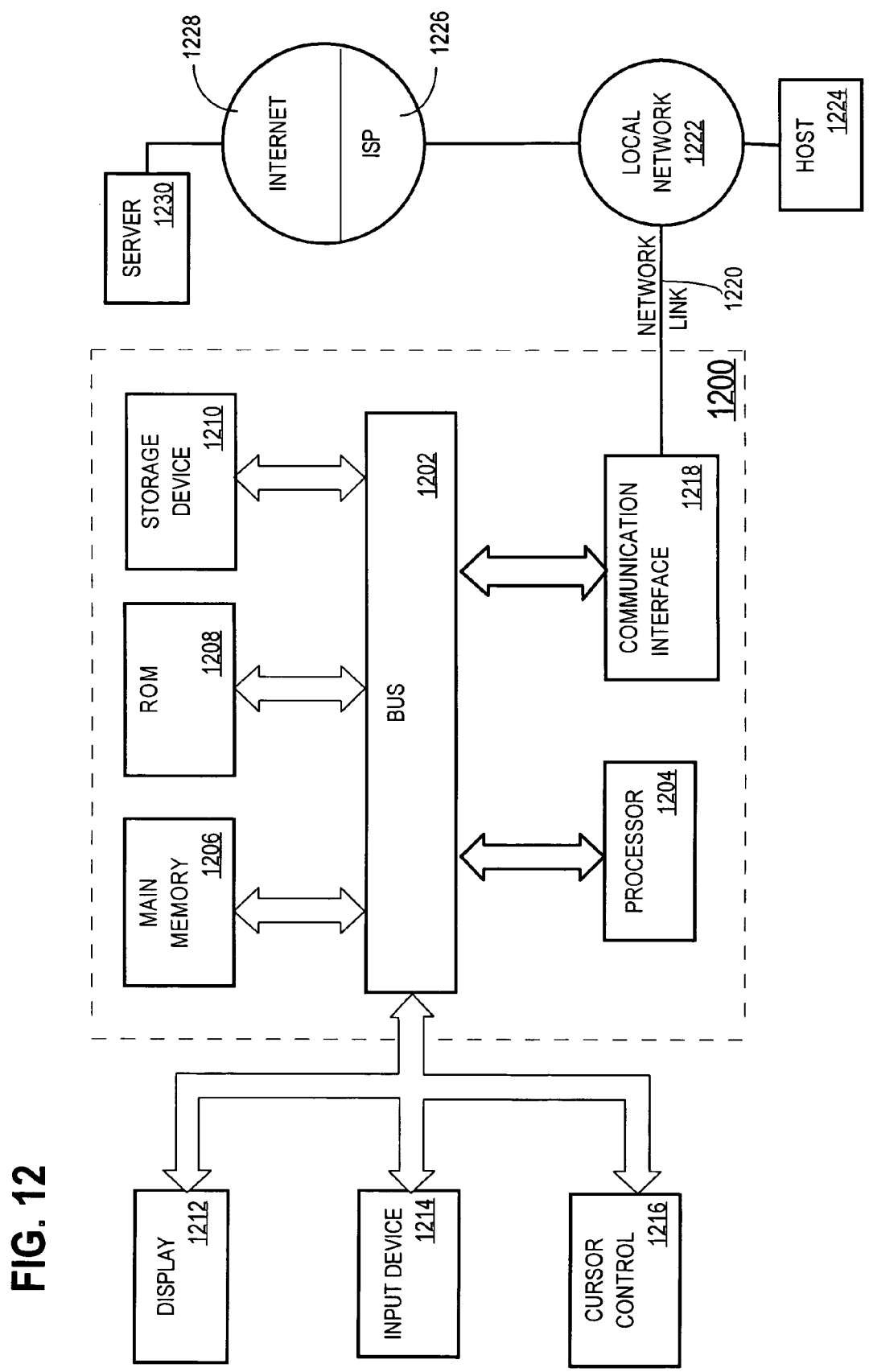
FIG. 12 is a block diagram that illustrates a computer system upon which embodiments of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may be used to implement the techniques described herein. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   sending, over a network, a user interface to a client node, wherein the client node:
      receives a not-yet-submitted search query from a user, and
      determines, prior to receiving an indication from the user that the not-yet-submitted search query is completely formed, whether the not-yet-submitted search query (a) includes a character in a set consisting of non-alphanumeric characters or (b) matches a phrase in a dictionary of pre-defined phrases; and
   receiving, over the network, the not-yet-submitted search query from the client node only after the client node determines that the not-yet-submitted search query includes a character in the set or matches a phrase in the dictionary;
   prior to receiving an indication from the client node that the not-yet-submitted search query is completely formed, performing the steps of:
      determining a predicted search query by predicting what the not-yet-submitted search query will be when completed; and
      determining, based on the predicted search query, an alternative search query that differs from the predicted search query;
   providing the alternative search query to the client node;
   wherein the steps are performed on one or more computing devices.

2. The method of claim 1, wherein determining the alternative search query comprises determining an alternative spelling for the predicted search query.

3. A computer-readable storage medium storing instructions which, when executed by one or more processors, cause the one or more processors to perform the method of claim 2.

4. The method of claim 1, wherein determining the alternative search query comprises determining a search query that is related to the predicted search query.

5. The method of claim 4, wherein the predicted search query comprises an acronym and determining the alternative search query comprises:
   forming one or more terms by expanding the acronym; and
   including the one or more terms in the alternative search query.

6. A computer-readable storage medium storing instructions which, when executed by one or more processors, cause the one or more processors to perform the method of claim 5.

7. A computer-readable storage medium storing instructions which, when executed by one or more processors, cause the one or more processors to perform the method of claim 4.

8. The method of claim 1, wherein the alternative search query comprises one or more characters that lead the not-yet-submitted search query from the client node.

9. A computer-readable storage medium storing instructions which, when executed by one or more processors, cause the one or more processors to perform the method of claim 8.

10. The method of claim 1,, wherein the alternative search query comprises one or more characters inserted into the body of the not-yet-submitted search query from the client node.

11. A computer-readable storage medium storing instructions which, when executed by one or more processors, cause the one or more processors to perform the method of claim 10.

12. The method of claim 1, wherein determining the predicted search query comprises selecting the predicted search query from a set of historic search queries.

13. The method of claim 12, wherein determining the predicted search query is based on a frequency with which ones of the historical search queries were submitted as search queries.

14. A computer-readable storage medium storing instructions which, when executed by one or more processors, cause the one or more processors to perform the method of claim 13.

15. The method of claim 12, wherein determining the predicted search query is based on when ones of the historical search queries were submitted as search queries.

16. A computer-readable storage medium storing instructions which, when executed by one or more processors, cause the one or more processors to perform the method of claim 15.

17. A computer-readable storage medium storing instructions which, when executed by one or more processors, cause the one or more processors to perform the method of claim 12.

18. The method of claim 1, further comprises forming a modified search query from the not-yet-submitted search query from the client node prior to determining the alternative search query, wherein the alternative search query is based on the modified search query.

19. A computer-readable storage medium storing instructions which, when executed by one or more processors, cause the one or more processors to perform the method of claim 18.

20. A computer-readable storage medium storing instructions which, when executed by one or more processors, cause the one or more processors to perform the method of claim 1.

21. A computer-implemented method comprising the steps of:
- receiving, at a client node, a not-yet-submitted search query from a user;
- prior to receiving an indication from the user that the not-yet-submitted search query is completely formed, determining, at the client node, whether the not-yet-submitted search query (a) includes a character in a set consisting of non-alphanumeric characters or (b) matches a phrase in a dictionary of pre-defined phrases; and
- sending the not-yet-submitted search query from the client node to a search engine, to perform a search based on the not-yet-submitted search query, only after determining, at the client node, that the not-yet-submitted search query includes a character in the set or matches a phrase in the dictionary;
- wherein the not-yet-submitted query is sent over a network to the search engine;
- wherein the search engine, prior to receiving an indication from the client node that the not-yet submitted search query is completely formed, determines:
  - a predicted search query by predicting what the not-yet-submitted search query will be when completed, and
  - based on the predicted search query, an alternative search query that differs from the predicted search query;
- receiving, at the client node and from the search engine, the alternative search query;
- wherein the steps are performed on one or more computing devices.

22. The method of claim 21, wherein:
- determining further comprises determining whether a particular length of time has elapsed since the user last entered a character in the not-yet-submitted search query; and
- sending further comprising sending the not-yet-submitted search query to the search engine only after determining, at the client node, that the particular length of time has elapsed since the user last entered a character in the not-yet-submitted search query.

23. A computer-readable storage medium storing instructions which, when executed by one or more processors, cause the one or more processors to perform the method of claim 22.

24. The method of claim 21, wherein determining comprises determining whether the not-yet-submitted search query includes a character in the set consisting of non-alphanumeric characters.

25. A computer-readable storage medium storing instructions which, when executed by one or more processors, cause the one or more processors to perform the method of claim 24.

26. The method of claim 21, wherein determining comprises determining whether the not-yet-submitted search query matches a phrase in the dictionary of pre-defined phrases.

27. A computer-readable storage medium storing instructions which, when executed by one or more processors, cause the one or more processors to perform the method of claim 26.

28. A computer-readable storage medium storing instructions which, when executed by one or more processors, cause the performance of the method recited in claim 21.

* * * * *